United States Patent [19]

Otsuki

[11] Patent Number: 5,006,941

[45] Date of Patent: Apr. 9, 1991

[54] REVERSIBLE DRIVE MECHANISM FOR A TAPE RECORDING APPARATUS

[75] Inventor: Akira Otsuki, Iwaki, Japan

[73] Assignee: Alpine Electronics Inc., Tokyo, Japan

[21] Appl. No.: 319,517

[22] Filed: Mar. 3, 1989

[30] Foreign Application Priority Data

Apr. 6, 1988 [JP] Japan .................................. 63-46693

Apr. 6, 1988 [JP] Japan .................................. 63-46694

[51] Int. Cl.[5] ................................................ G11B 5/008

[52] U.S. Cl. ..................................... 360/96.2; 36/96.3; 36/137

[58] Field of Search .................... 360/96.2, 96.3, 96.4, 360/96.1, 137, 93, 74.1; 242/201, 204

[56] References Cited

U.S. PATENT DOCUMENTS

| | | | |
|---|---|---|---|
| 4,342,055 | 7/1982 | Osanai | 242/201 X |
| 4,419,702 | 12/1983 | Tanaka . | |
| 4,646,302 | 2/1987 | Ono | 360/137 |
| 4,698,706 | 10/1987 | Kilstofte | 360/96.4 |
| 4,896,234 | 1/1990 | Watanabe et al. | 360/96.3 X |

*Primary Examiner*—John H. Wolff

*Attorney, Agent, or Firm*—Guy W. Shoup; David W. Heid

[57] ABSTRACT

A motor for rotating a pair of capstan journals for feeding a tape in a tape recording apparatus is operable both in forward and reverse directions, so that the direction of feed of the tape is determined by the direction of operation of the motor. When the motor operates in the reverse direction, the head base first moves away from the tape and then approaches the tape again.

4 Claims, 28 Drawing Sheets

REVERSIBLE DRIVE MECHANISM FOR A TAPE RECORDING APPARATUS

FIELD OF THE INVENTION

This invention relates to an audio reproduction device and in particular to an audio reproduction device provided with an auto-reverse mechanism.

BACKGROUND OF THE INVENTION

In general, when a tape cassette is only half inserted into an audio reproduction device, this cassette is set automatically in the play-back state. A so-called auto-reverse mechanism, which detects automatically the end of the tape, uses pinch rollers to thrust the tape on capstan journals, turning in opposite directions in order to move this tape in the backward direction and continue the play-back state. Further, it is so constructed that the fast forward (FF) operation (by which the capstan journals and the pinch roller thrusted thereon are kept away from each other and the rotation of the reel mechanism is increased), the rewinding (REW) operation, (the fast forward reproducing (QUE) operation (where the tape is forwarded with a high speed while reproduced sound is generated), the backward reproducing (REVEW) operation while reproduced sound is generated, etc. are possible. In addition, it is so constructed that these mechanisms and operations are performed by combining various means such as gear mechanisms, cam mechanisms, etc., starting from the rotation of a driving motor turning only in one direction.

OBJECT OF THE INVENTION

However, according to the prior art techniques described above, since the driving motor can rotate only in one direction, various sorts of gear and cam mechanisms are required for making the different operations possible, which makes necessarily the construction complicated, fabrication and mounting different, and fabrication cost high. Furthermore, since the construction is complicated, it is feared that problems take place and maintenance cost is increased.

This invention has been done in view of the problematical points described above of the prior art techniques and the object thereof is to provide an audio reproduction device, by which the driving motor can be rotated both forward are backward, the working mechanism is simplified and fabrication cost is reduced.

SUMMARY OF THE INVENTION

In order to achieve the object described above an audio reproduction device according to this invention comprises a motor capable of rotating both forward and backward; a pair of reel mechanisms rotated by the drive of the motor; a pair of capstan journals rotated by the drive of the motor; a pair of pinch rollers touched to and separated from the capstan journals; a head base which is engaged with the pinch rollers and separated forcedly from the capstan journals; and a holding mechanism for holding the head base at an advanced position; and they are so constructed that, when the motor begins an operation to rotate in the backward direction at least during a play operation, the holding mechanism is released so that the head base is retreated and the pinch rollers are separated from the capstan journals.

Further, in order to achieve the above object, an audio reproduction device according to this invention comprises a head base, on which a magnetic head is mounted and which is forwarded or retreated; a holding mechanism for holding the head base at an advanced position; and an FF/REW mechanism, which engages and stops the head base forwarded by the holding mechanism before the termination of the forwarding movement thereof; further it is so constructed that it comprises a drive motor capable of rotating both forward and backward, a pose lever rotated, responding to the rotational direction of this drive motor; a pose gear, with which a pivoting gear disposed rotatably on this pose lever is engaged directly or indirectly through an intermediate gear, responding to the rotation of the drive motor forward or backward; a head base advanced by an engaging and stopping cam disposed on this pose gear and held at an advanced position; and a solenoid mechanism for engaging and stopping the pose gear at the engaged and stopped position thereof to stop the rotation thereof; further it is so constructed that it comprises a drive motor capable of rotating both forward and backward, wherein a tape loading operation is effected by the rotational movement of the drive motor and the tape is FWD-moved, the rotational directions of the drive motor at this FWD movement and the tape loading operation being same.

By using the means described above, when the drive motor begins the reverse rotational operation as the PLAY state from the PLAY state, since the holding mechanism can be necessarily released, the contact of the pinch rollers with the capstan shafts is removed, and thus even if the capstan journal rotate in the reverse direction, the tape is never moved in the reverse direction and it is prevented that the tape is wound around the capstan journals.

Further, by using the means described above, the head base is locked at the position of FF/REW and the FF/REW operation can be effected. Furthermore, which ever is the direction of the rotation of the drive motor, forward or reverse, since the direction of the rotation of the drive motor is always the same for the FWD movement and for the tape loading operation, independently of the direction of the movement of the tape at the eject operation, in the PLAY state the movement of the tape is always in the FWD direction at the tape loading operation. In this way, the drive motor capable of rotating both forward and backward can be used, which can reduce the fabrication cost.

DETAILED DESCRIPTION

Figure 1:
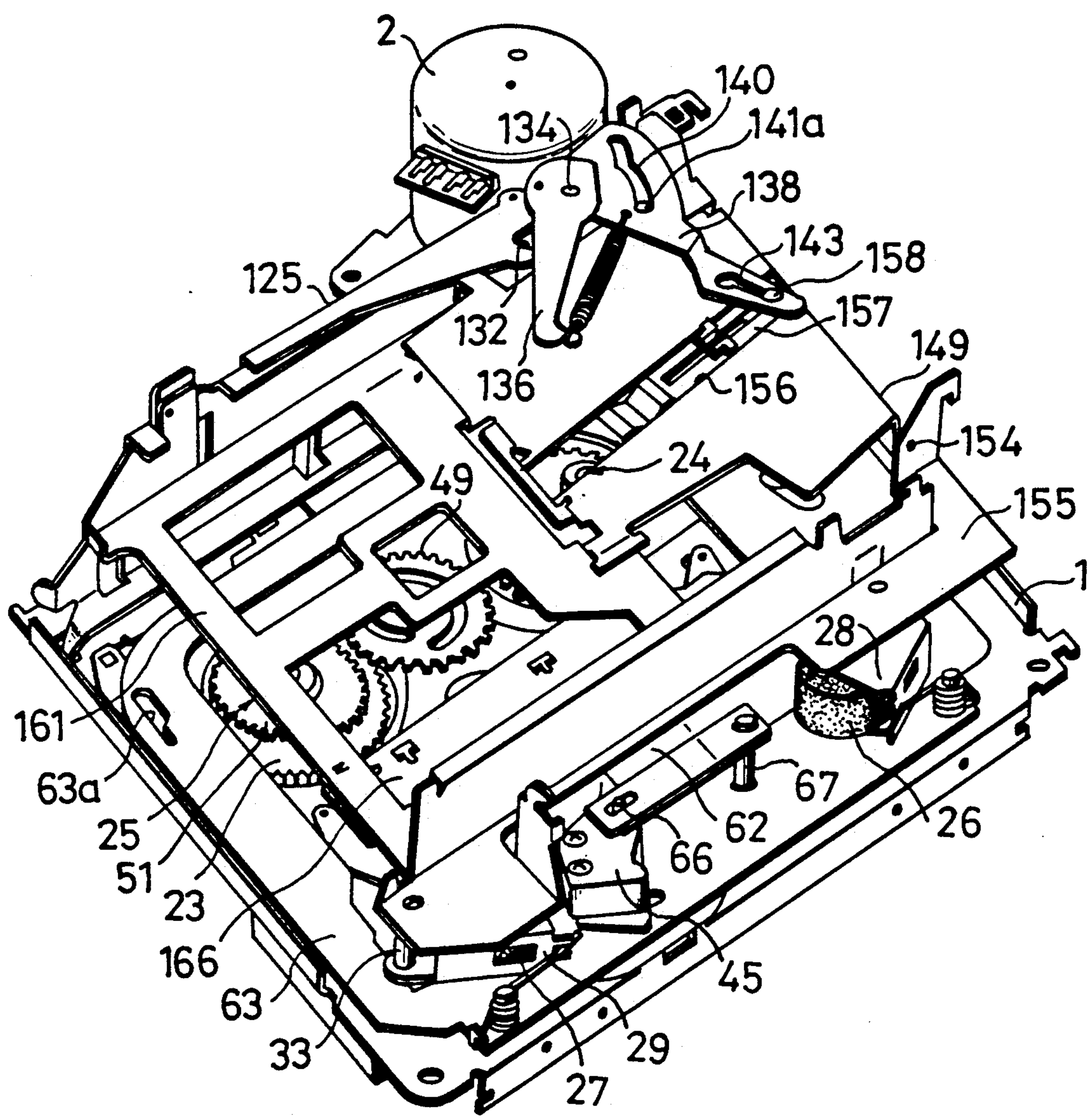
FIG. 1 is a perspective view of an audio reproduction device according to this invention.

Hereinbelow an embodiment of this invention will be explained more in detail, referring to the drawings.

Figure 2:
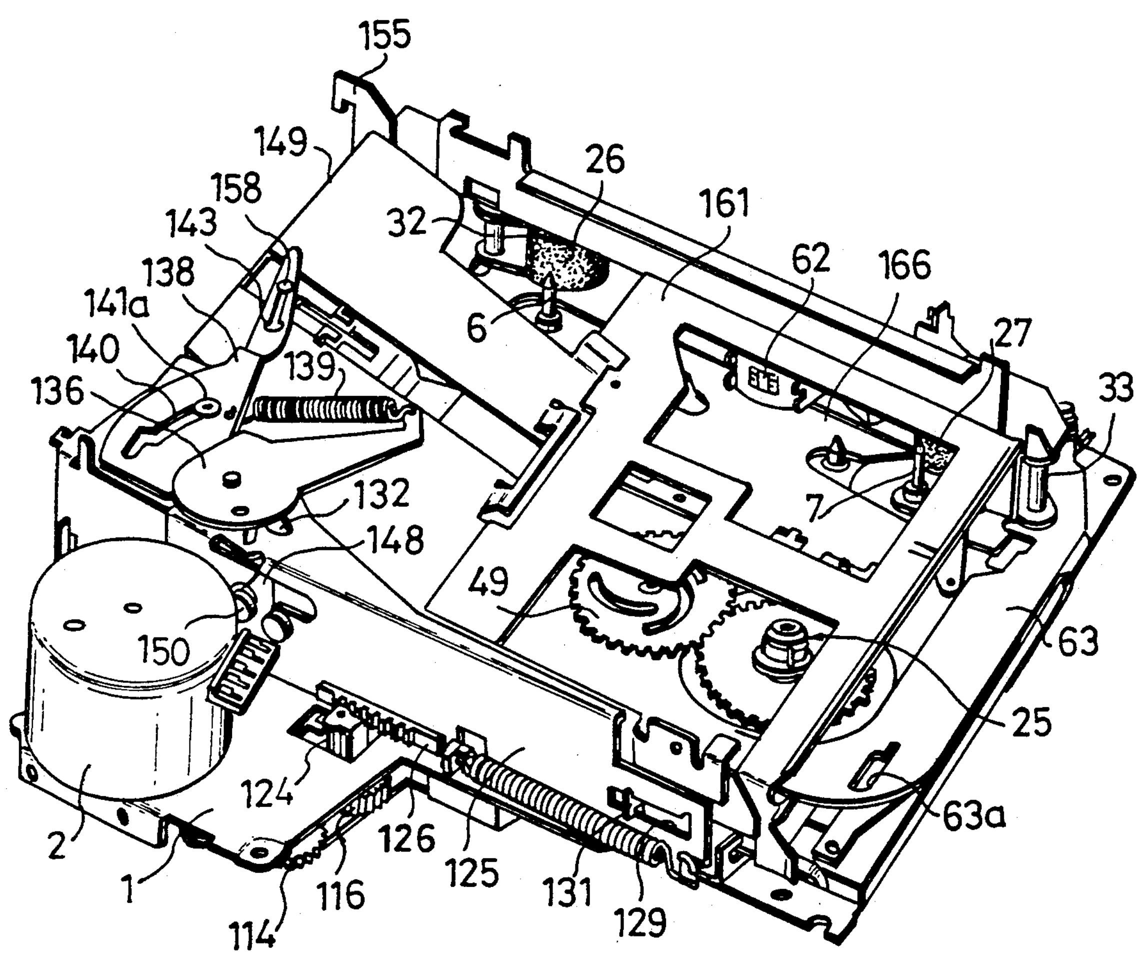
FIG. 2 is a perspective view of the same device seen in another direction.
Figure 3:
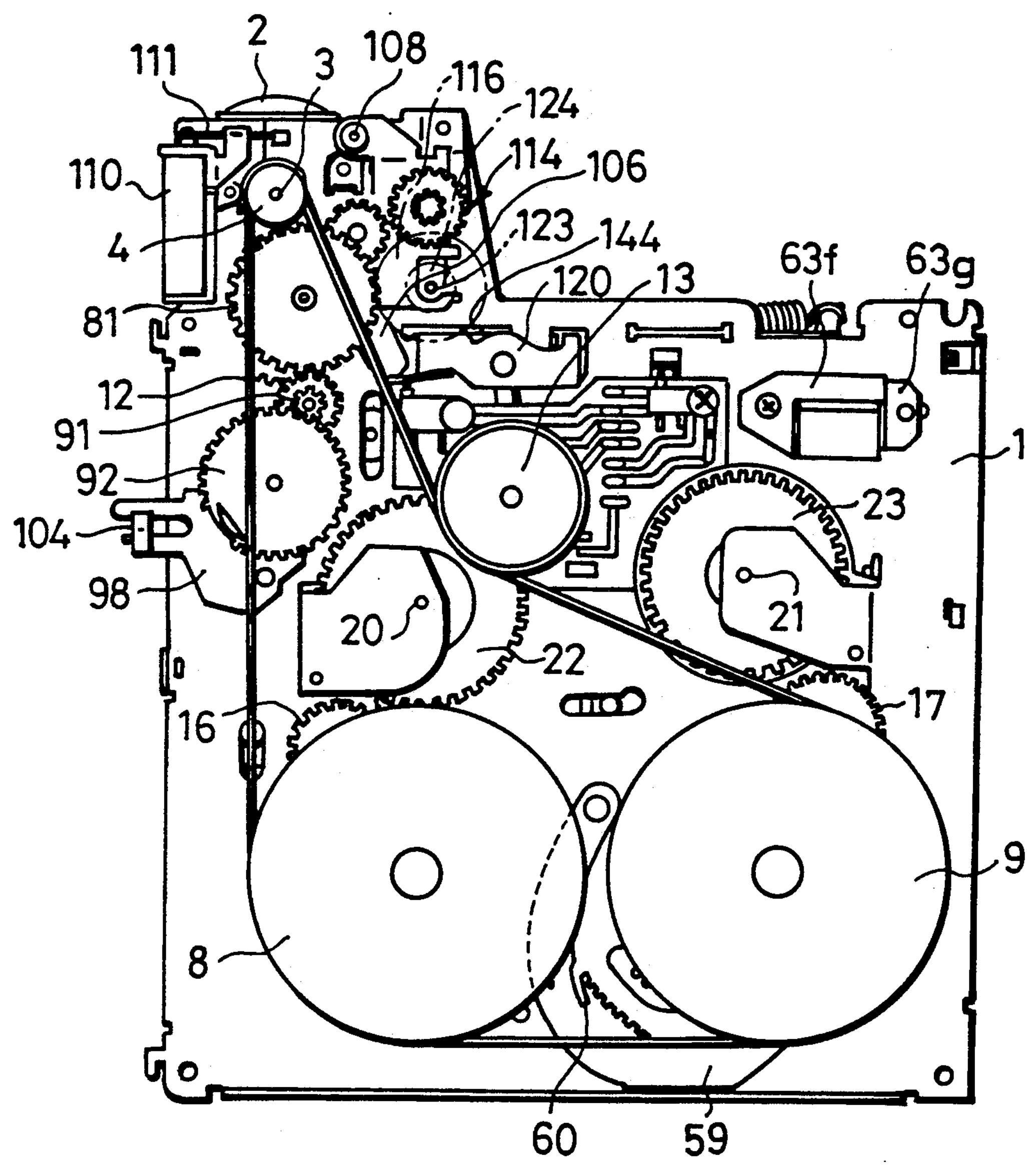
FIG. 3 is a bottom view of the same device, the bottom cover being dismounted.
Figure 4:
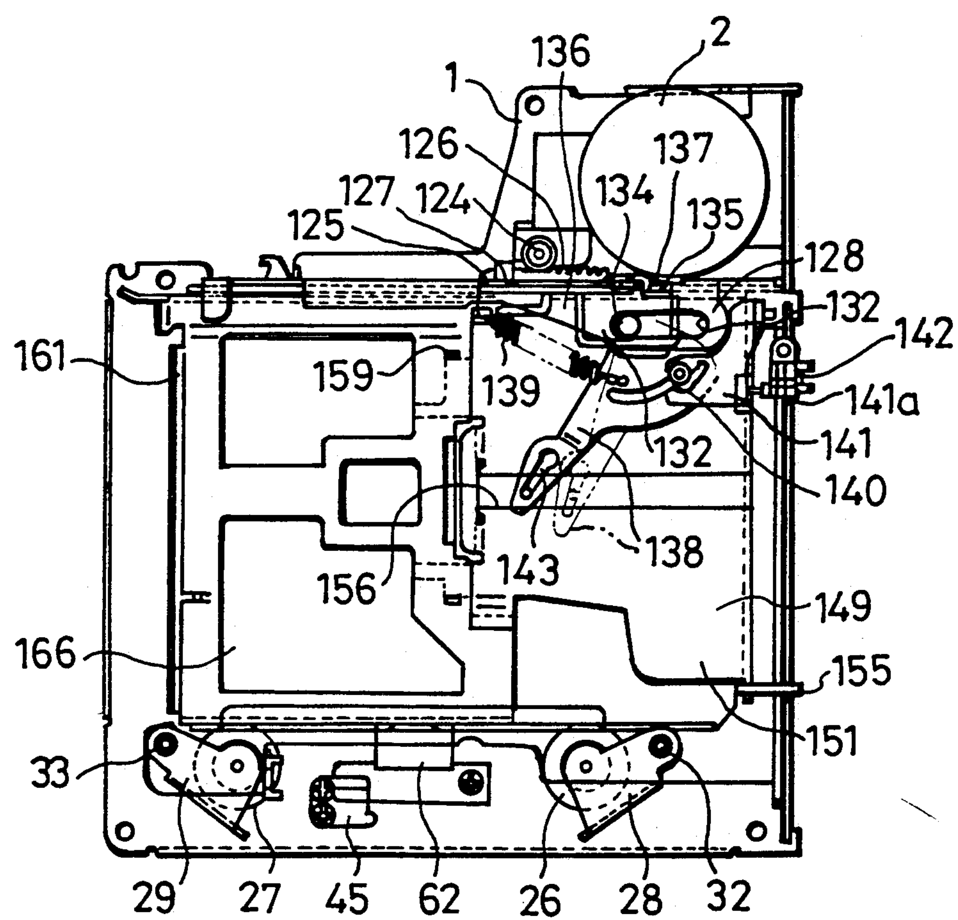
FIG. 4 is a plan view of the same device indicating the state, where the eject operation is terminated.
Figure 5:
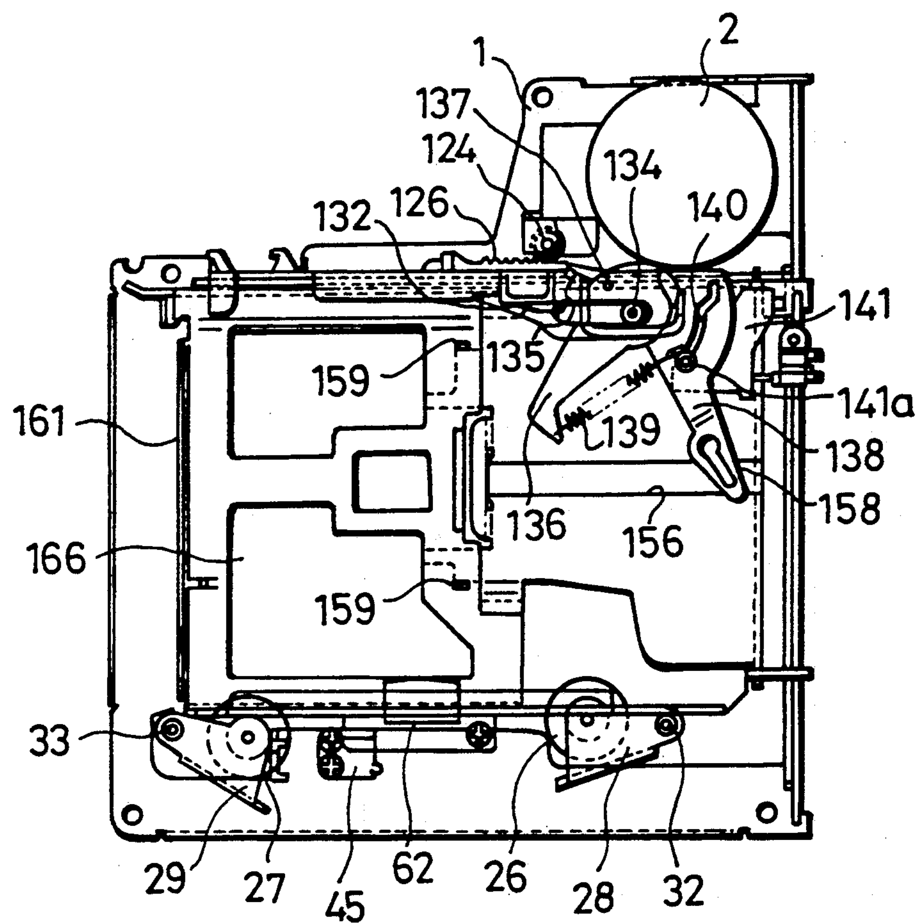
FIG. 5 is a plan view of the same device indicating the state before the eject operation.
Figure 6:
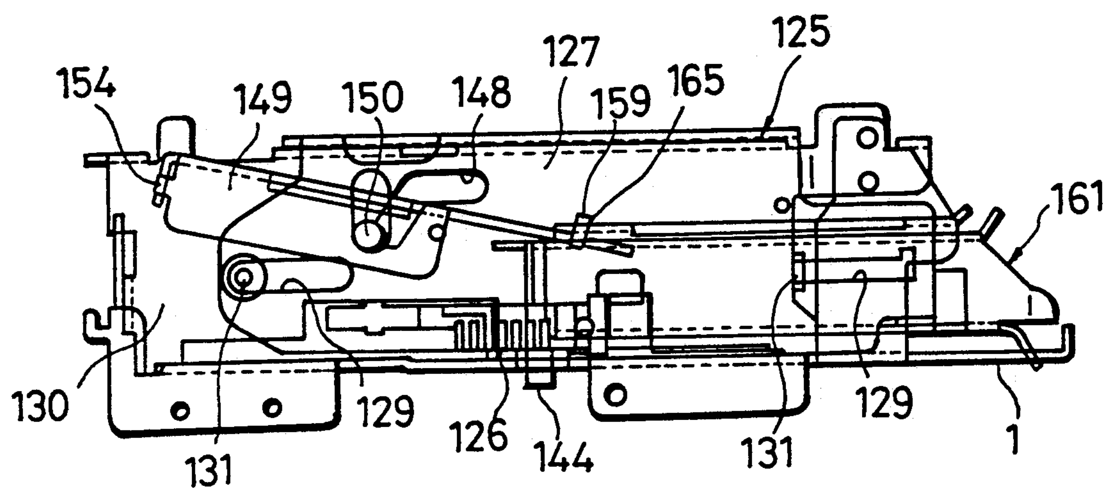
FIG. 6 is a side view of the device indicated in FIG. 5.
Figure 7:
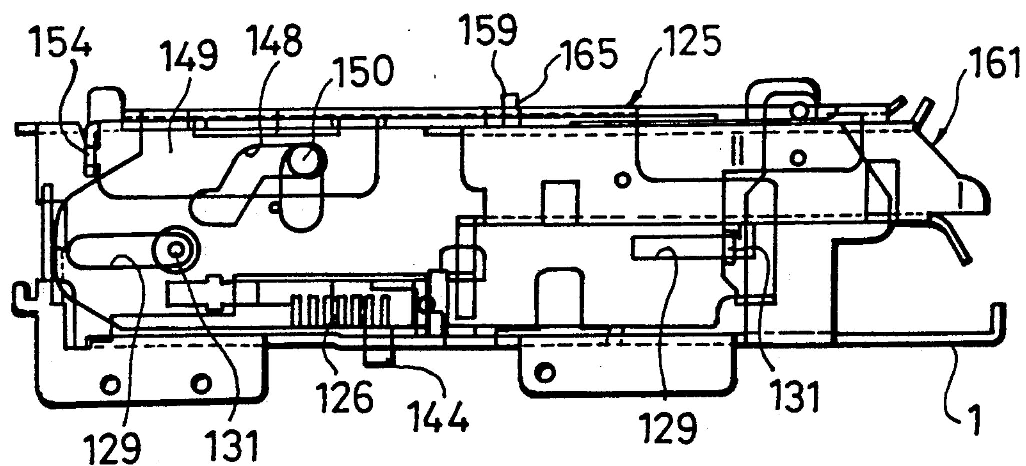
FIG. 7 is a side view of the device indicated in FIG. 4.
Figure 8:
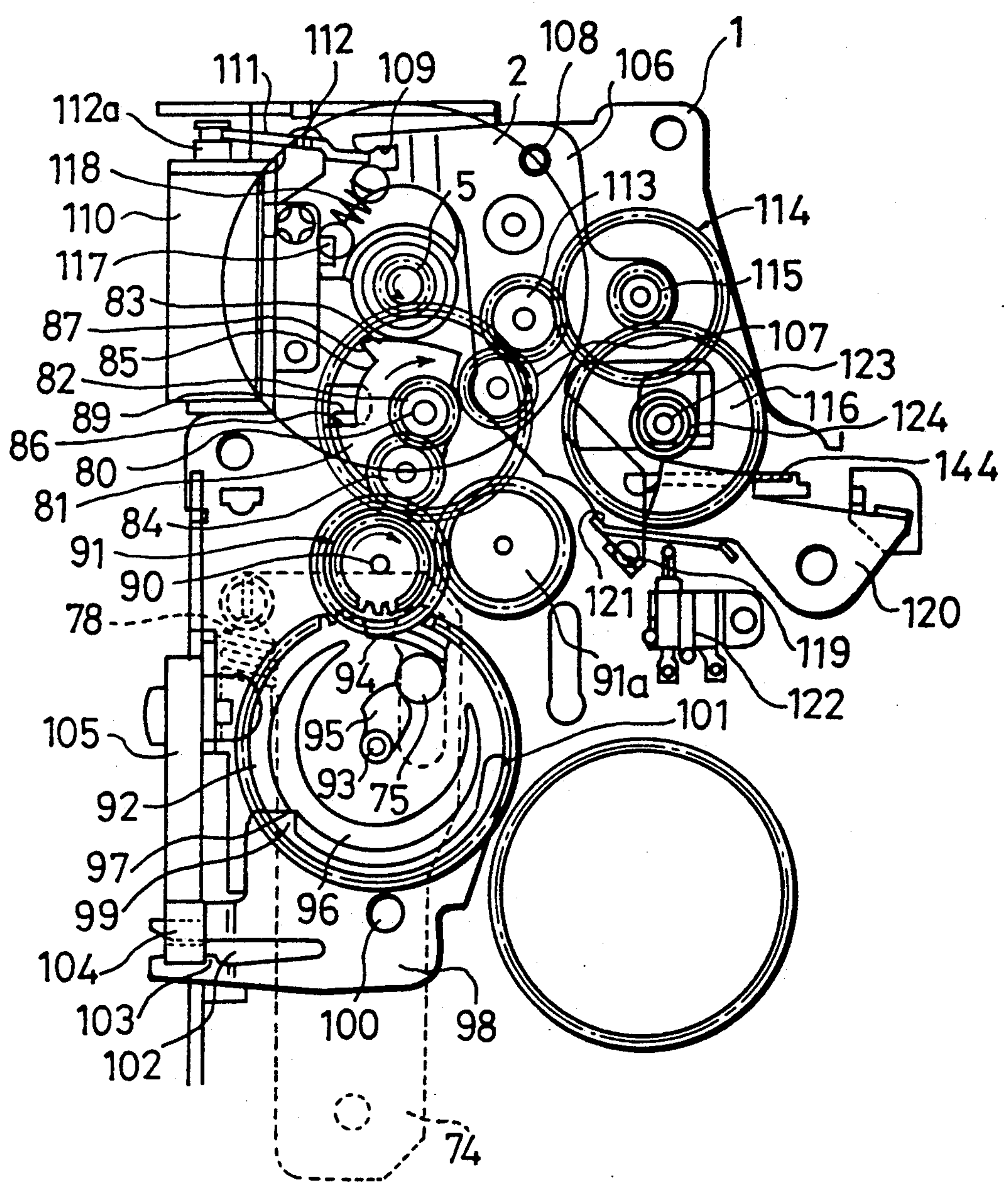
FIG. 8 to 10 are schemes for explaining the path portion, along which the movement of the driving motor is transmitted, FIG. 8 being a bottom view of the principal part of the device indicating the power-assist drive, when the driving motor rotates counterclockwise, FIG. 9 being a bottom view of the principal part of the device indicating the power-assist drive, when the driving motor rotates clockwise, FIG. 10 being a bottom view of the principal part of the device, when the driving motor and a rack are in the transmission state.
Figure 9:
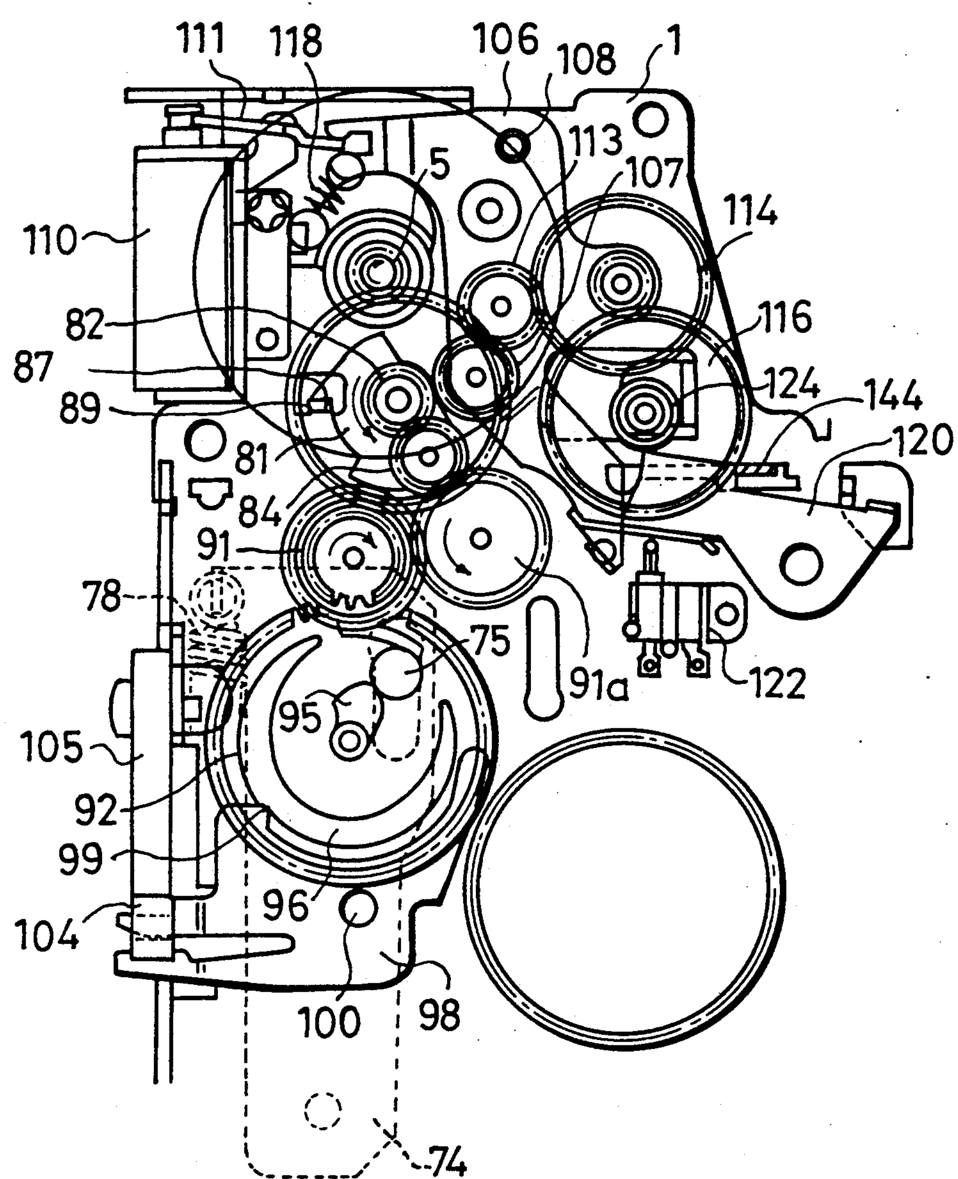
Figure 10:
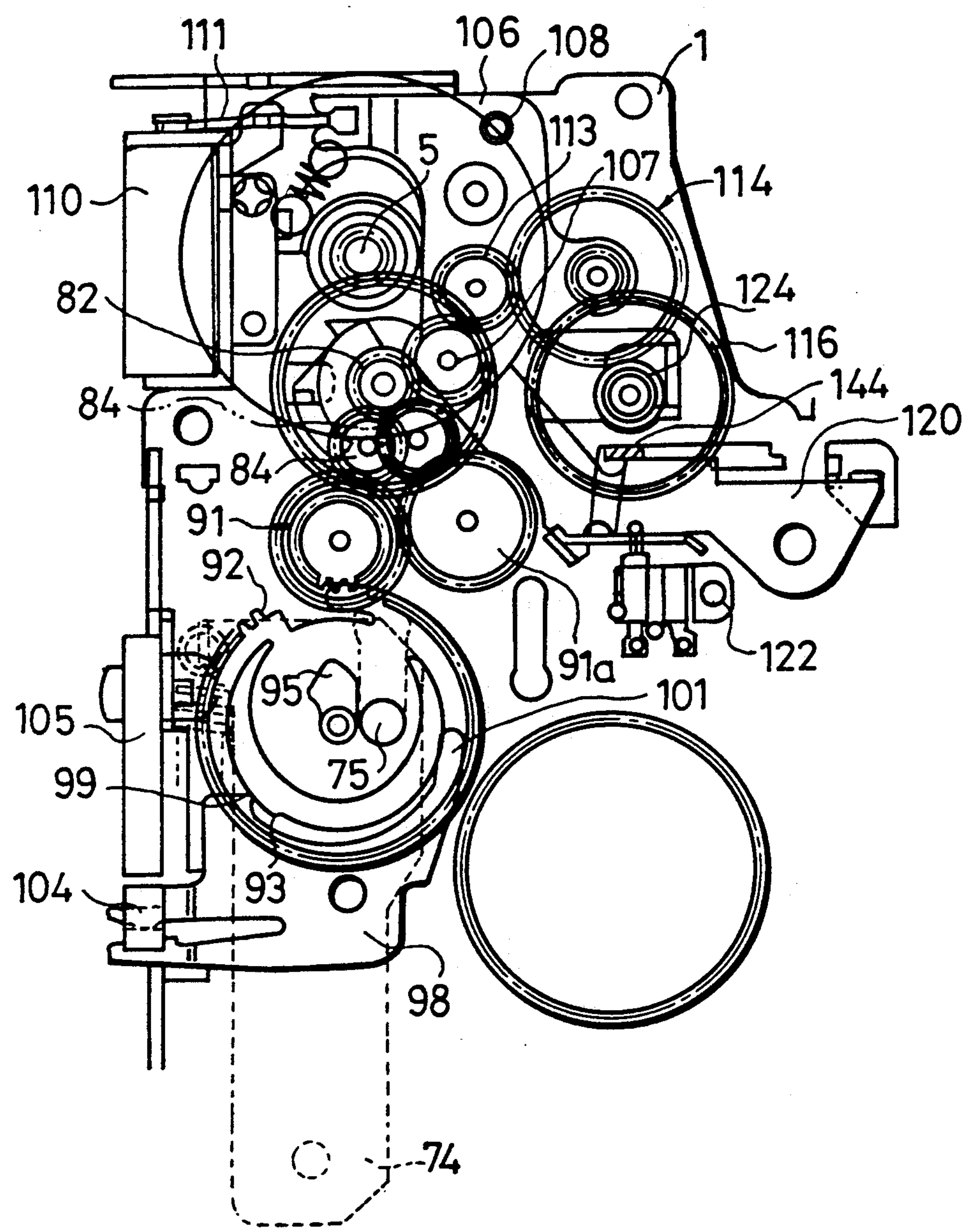
Figure 11:
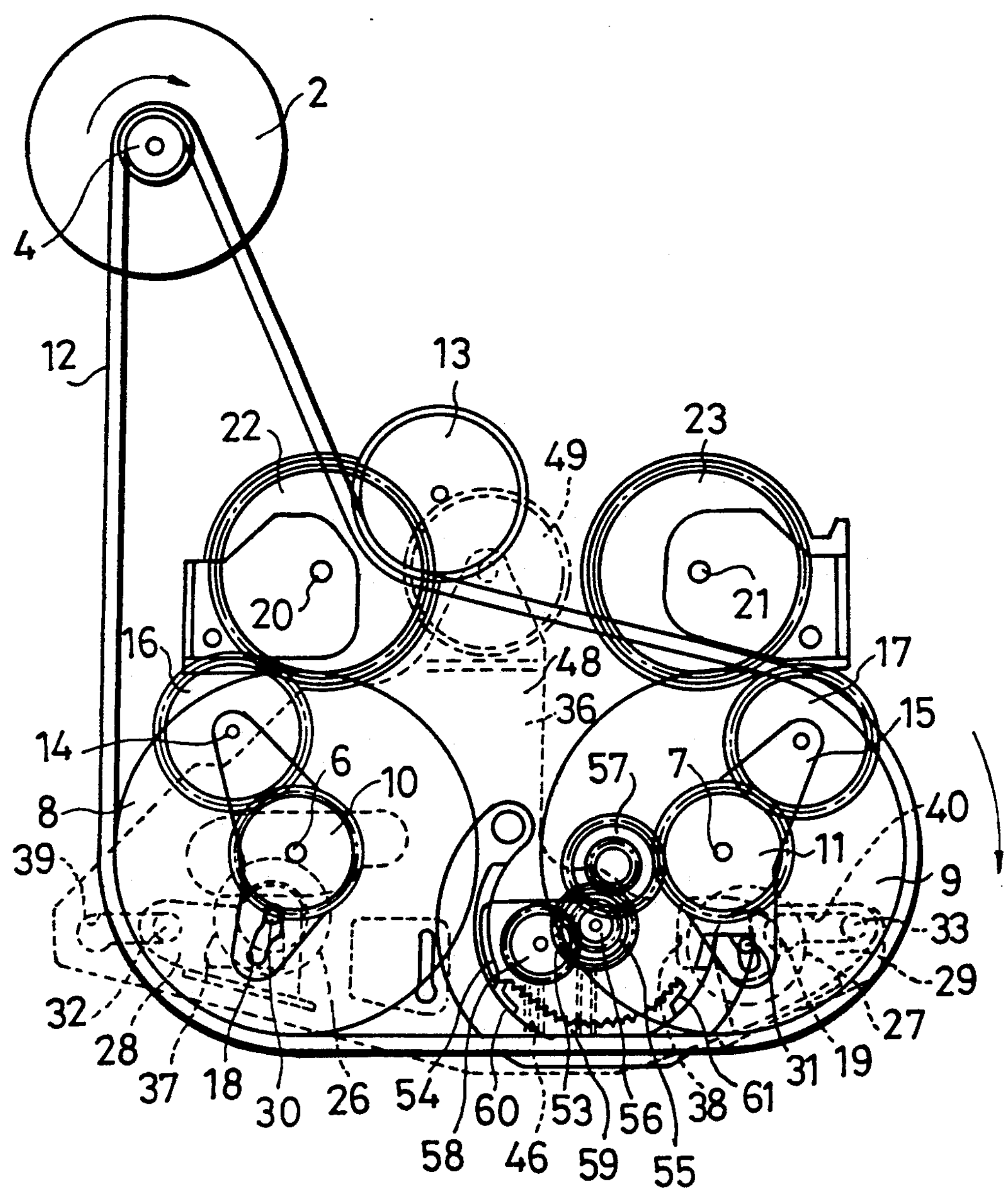
FIGS. 11 and 12 are bottom views of the principal part of the device indicating the state, where the select lever is in the right and the left position, respectively.
Figure 12:
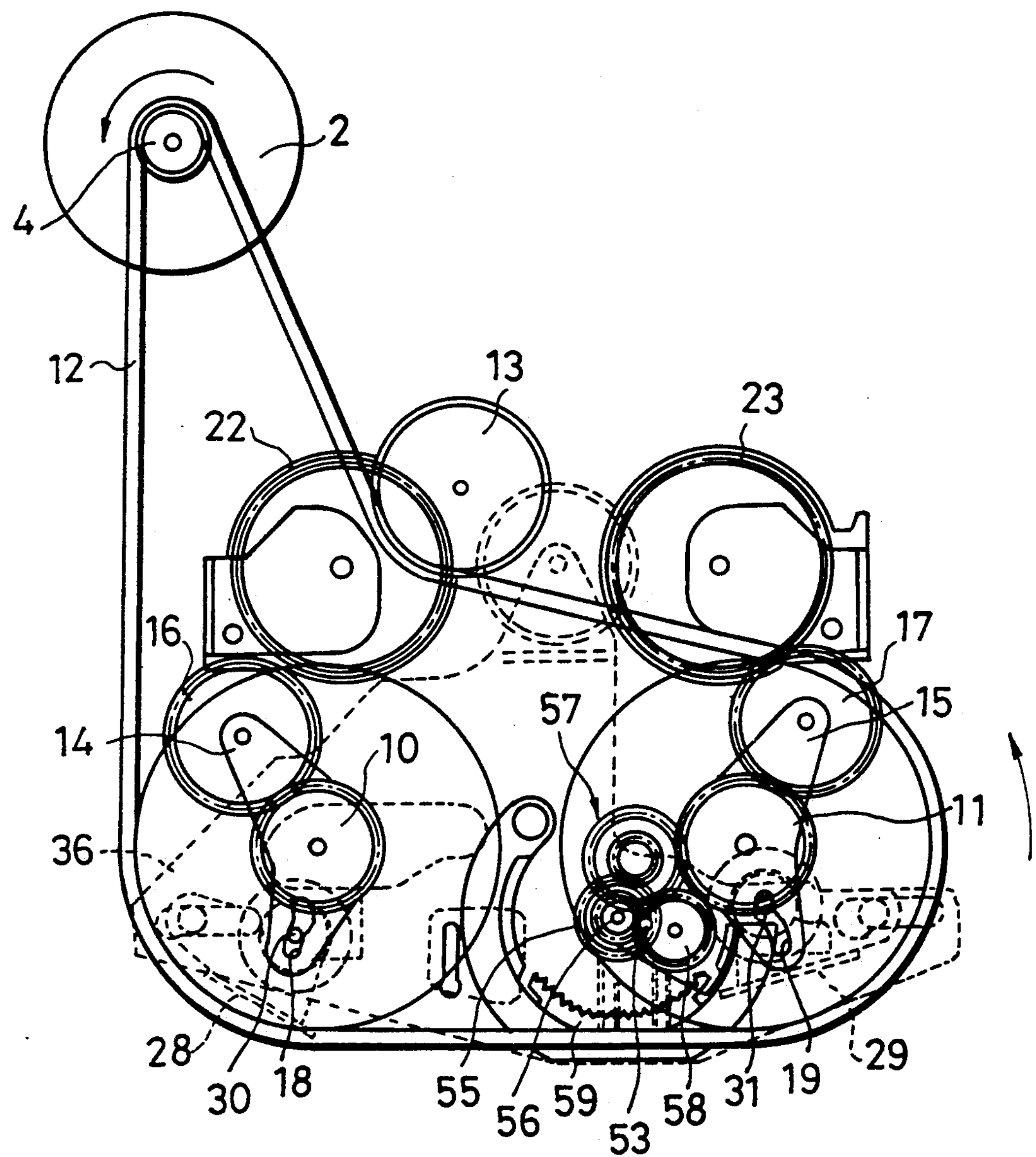
Figure 17:
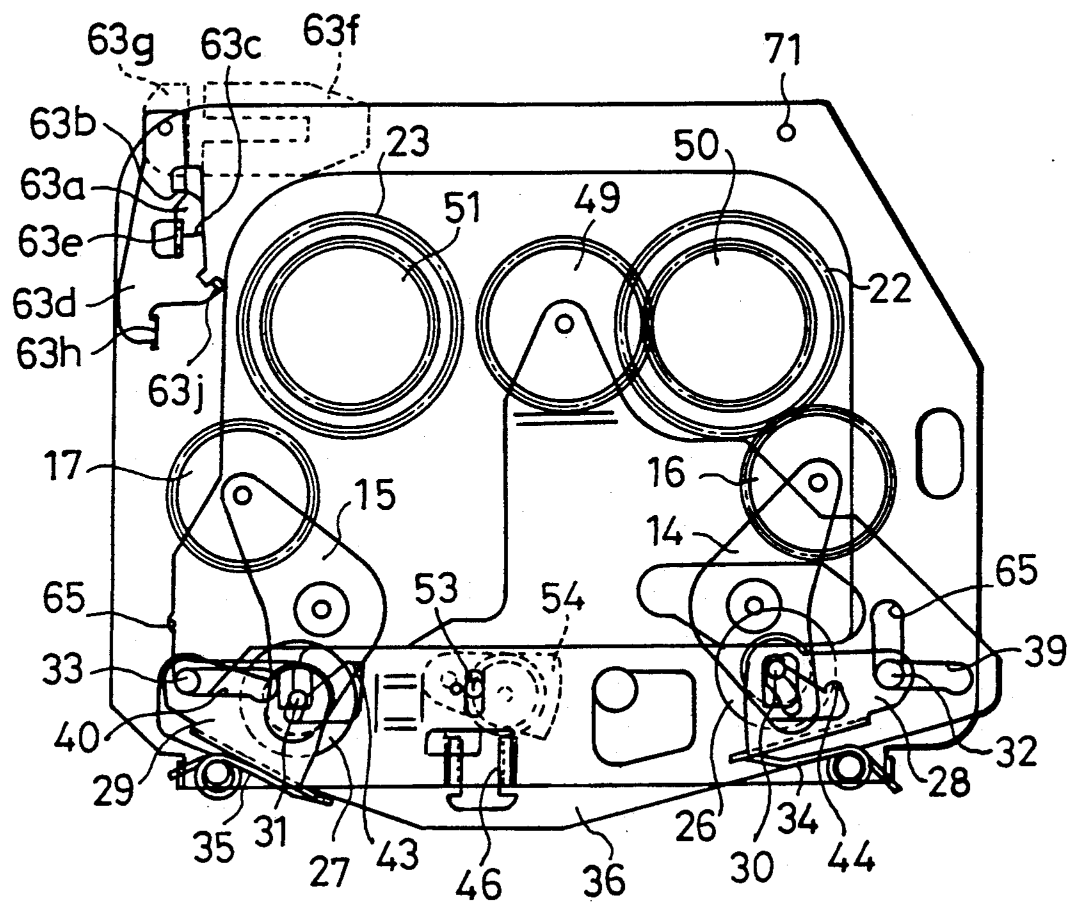
FIG. 17 is a plan view of the principal part of the device indicating the PLAY state in the FWD movement.
Figure 18:
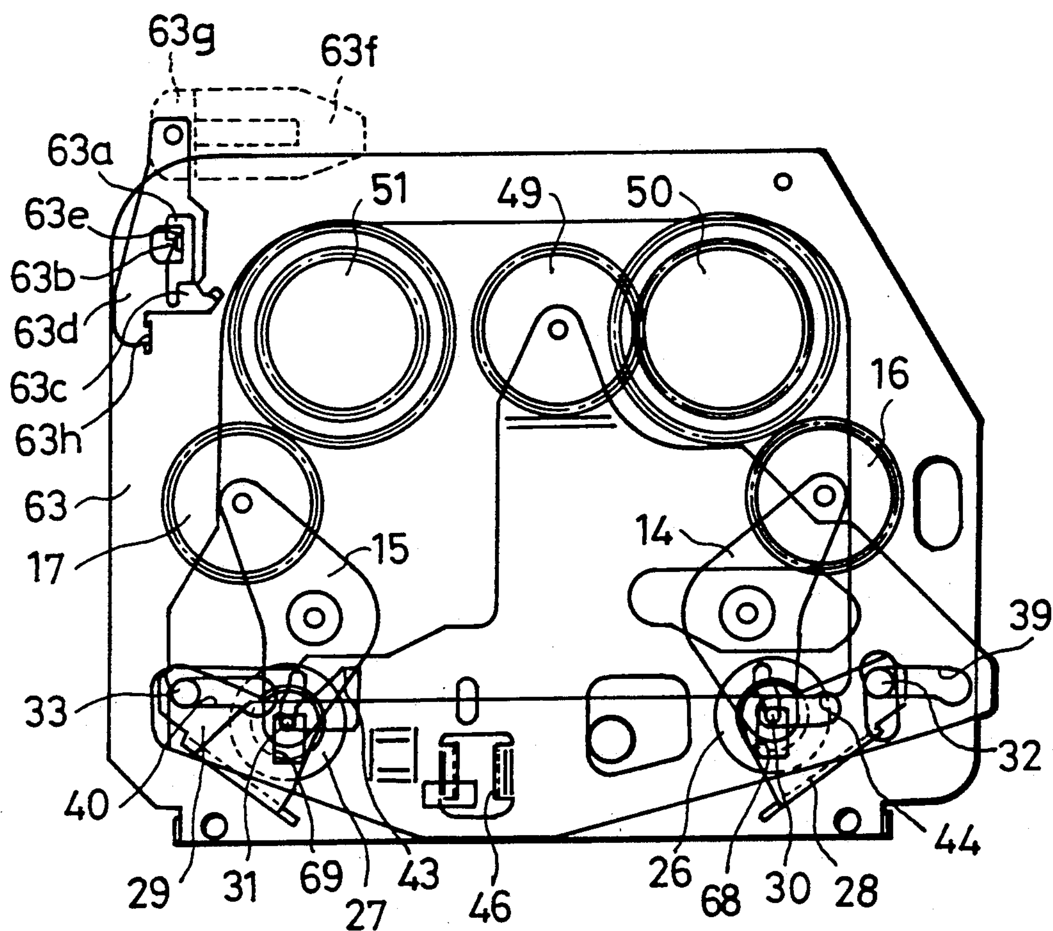
FIG. 18 is a plan view of the principal part of the device indicating the state, where the head base is retreated.
Figure 19:
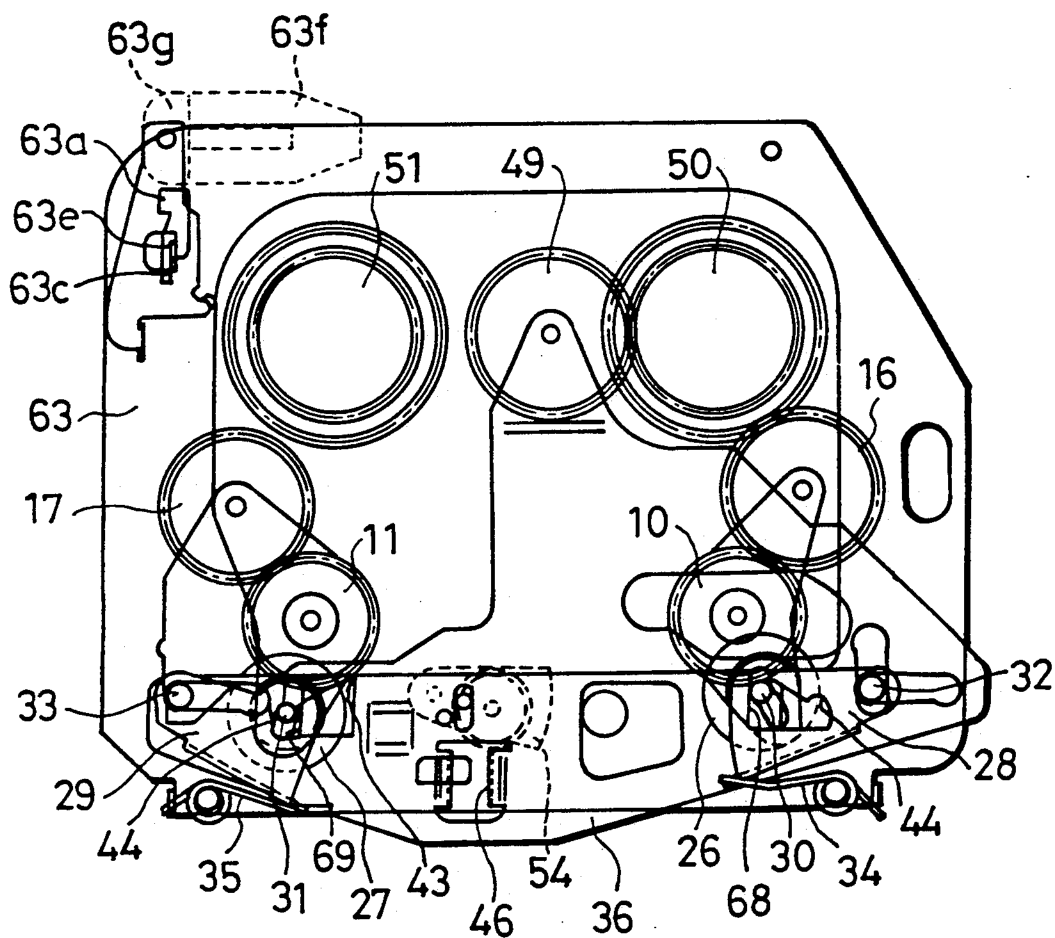
FIG. 19 is a plan view of the principal part of the device for explaining the FF operation.
Figure 20:
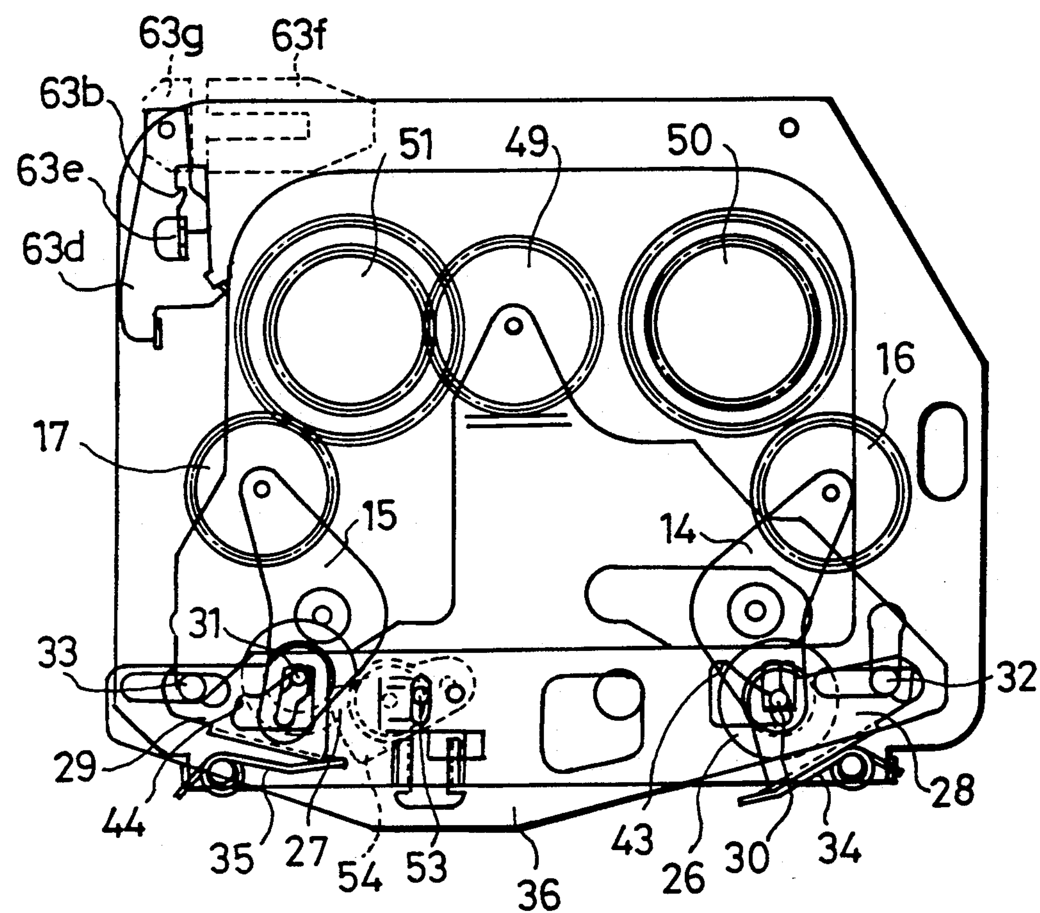
FIG. 20 is a plan view of the principal part of the device indicating the PLAY state in the RWD movement.
Figure 21:
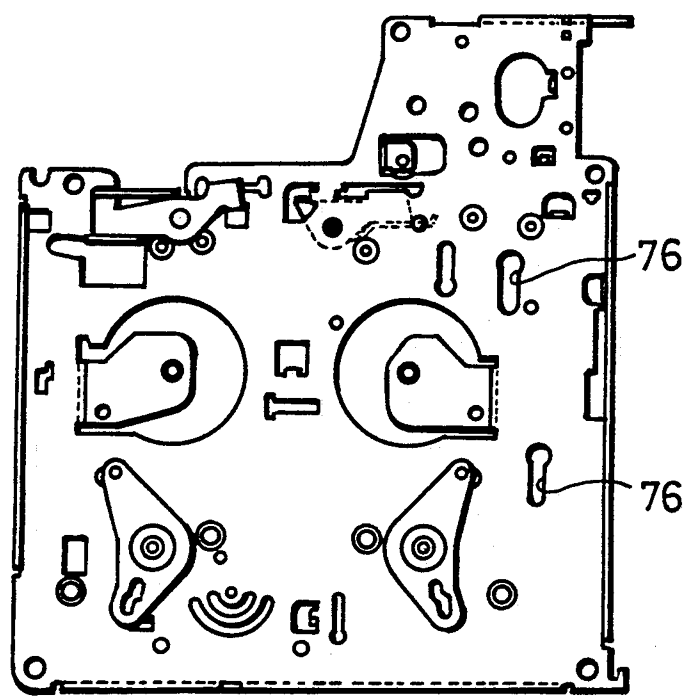
FIG. 21 is a bottom view of the chassis.
Figure 22:
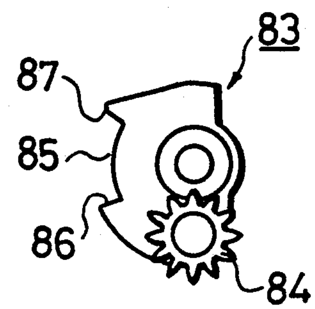
FIG. 22 is a front view of the pose lever.
Figure 23:
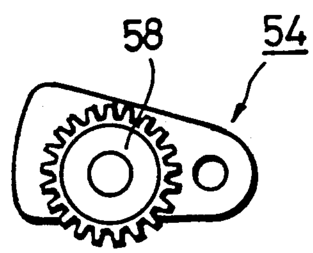
FIG. 23 is a front view of a rotating piece, on which a planet gear is mounted.
Figure 24:
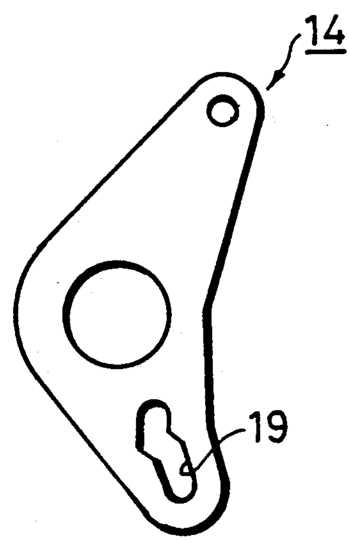
FIG. 24 is a front view of a pinch lever.
Figure 25:
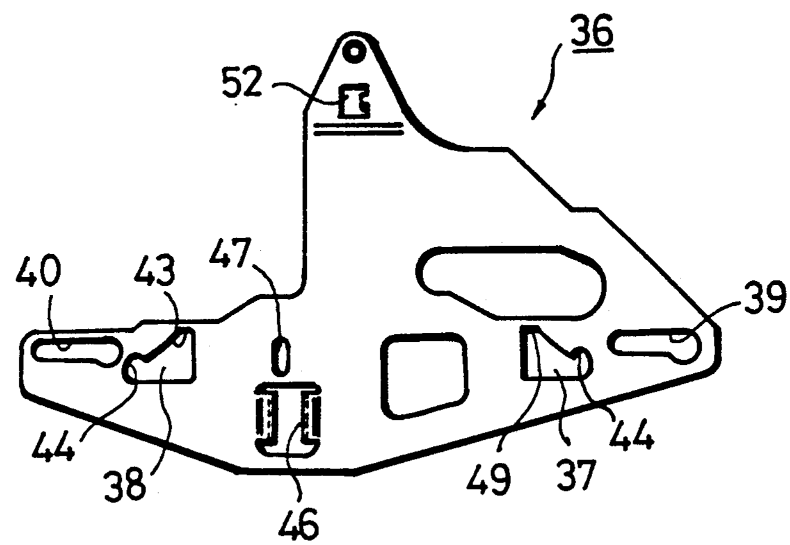
FIG. 25 is a front view of the select lever.
Figure 26:
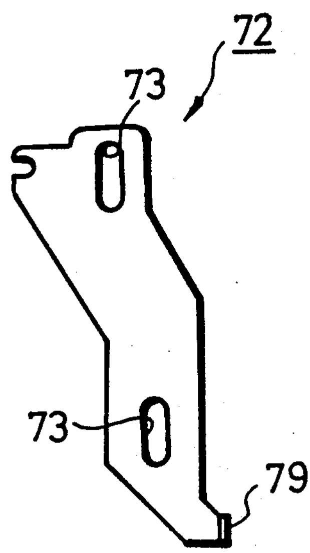
FIG. 26 is a front view of a first sub base.
Figure 27:
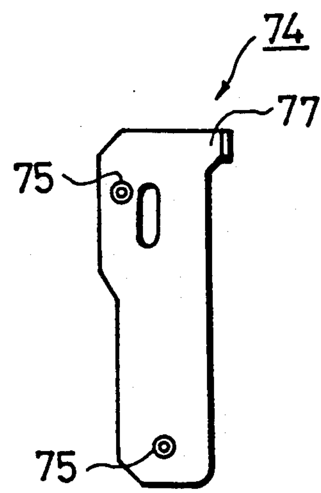
FIG. 27 is a front view of a second sub base.
Figure 28:
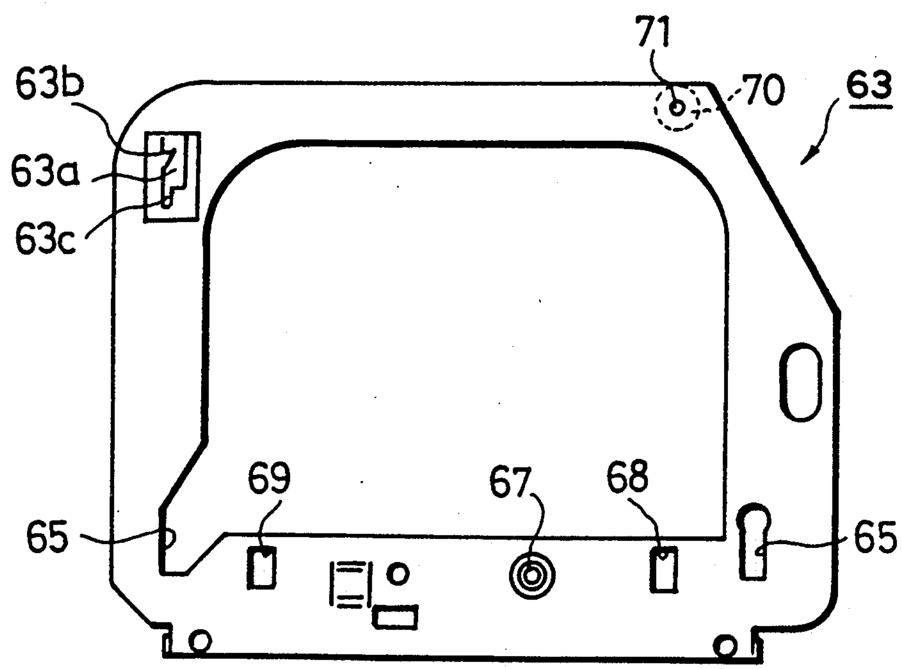
FIG. 28 is a front view of the head base.
Figure 29:
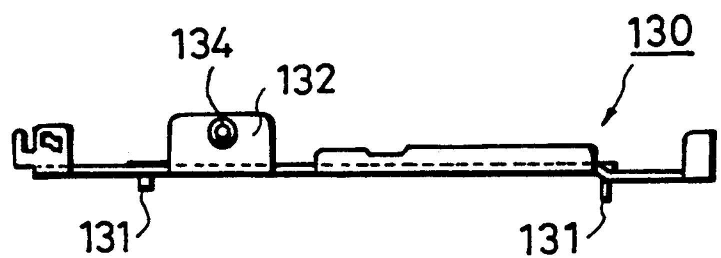
FIGS. 29 and 30 are a plan view and a side view of a side plate, respectively.
Figure 30:
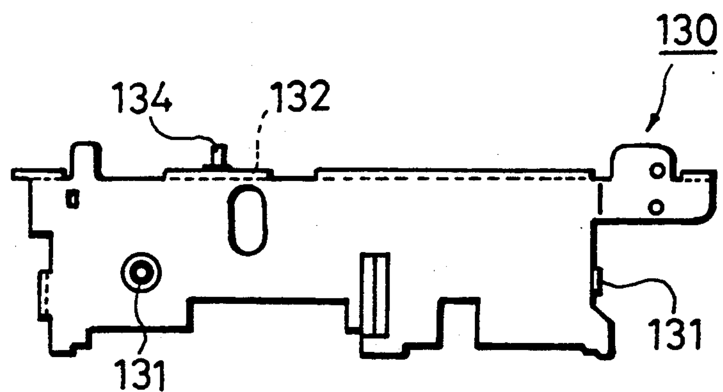
Figure 31:
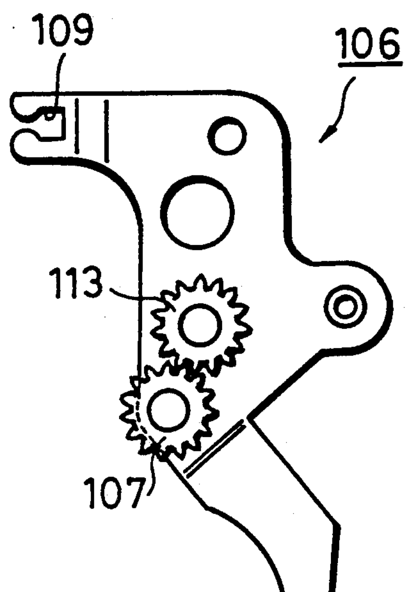
FIG. 31 is a front view of the clutch lever.
Figure 32:
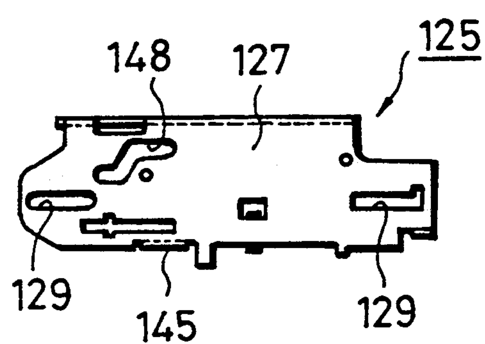
FIGS. 32 and 33 are a side view and a plan view of the eject lever, respectively.
Figure 33:
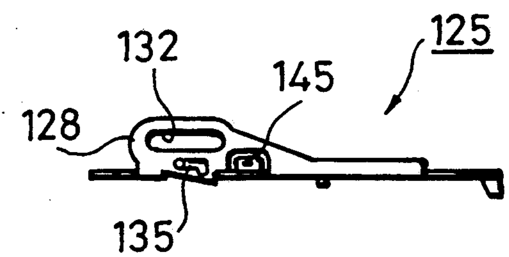
Figure 34:
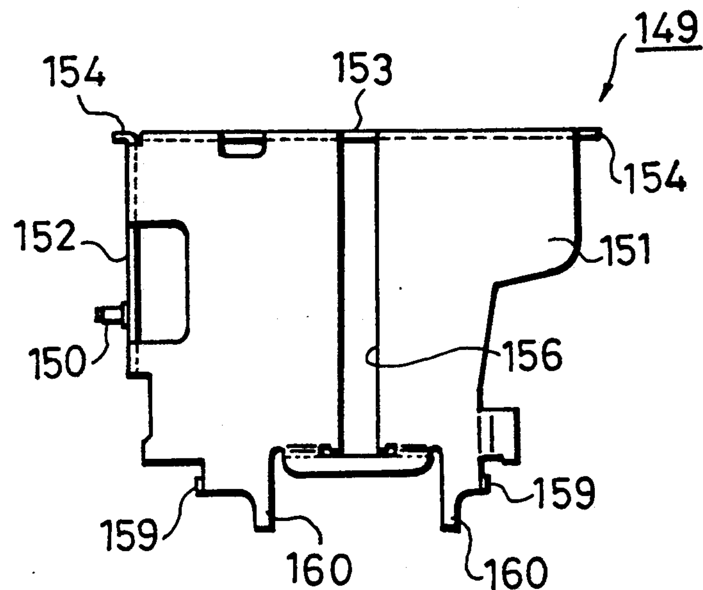
FIG. 34 is a plan view of the plate base.
Figure 35:
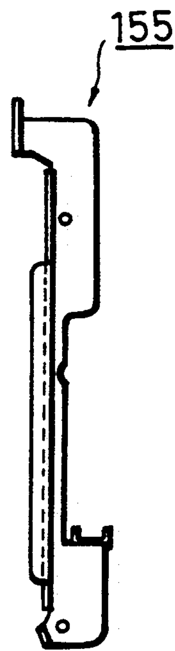
FIGS. 35 and 36 are a plan view and a side view of the holder frame, respectively.
Figure 36:
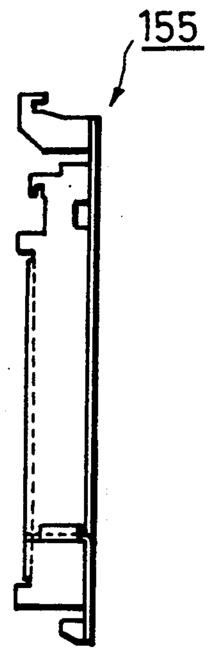
Figure 37:
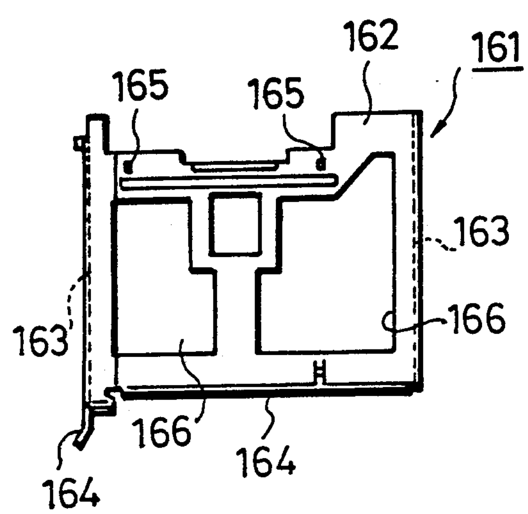
FIGS. 37 to 40 are a plan view, a front view and a left and a right side view of the cassette holder, respectively.
Figure 38:
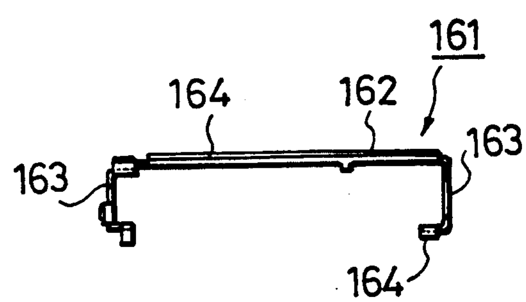
Figure 39:
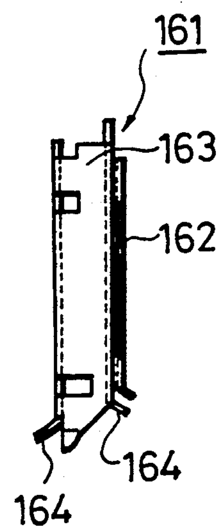
Figure 40:
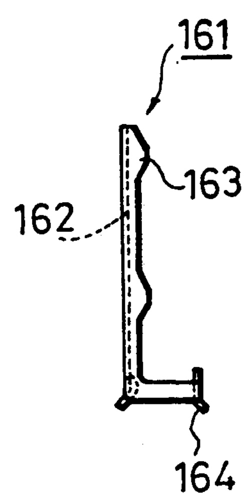
Figure 41:
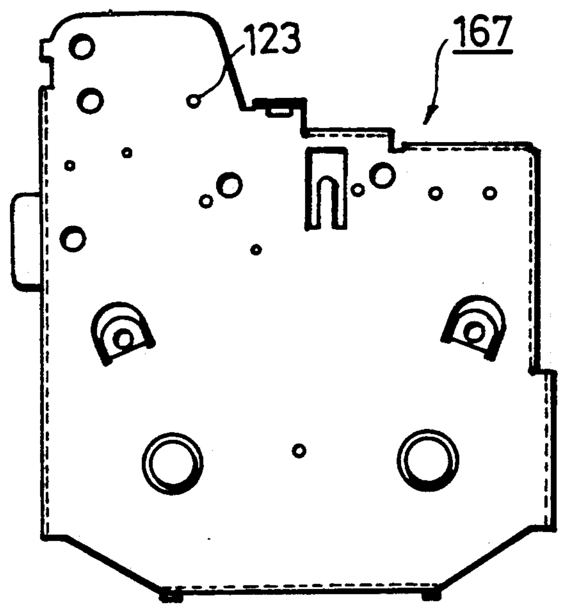
FIGS. 41 and 42 are a bottom view and a side view of the bottom cover.
Figure 42:
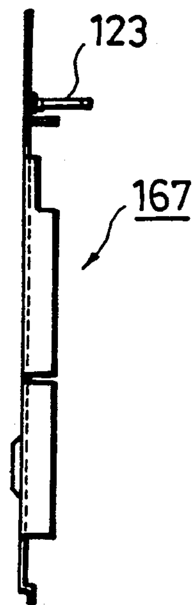
Figure 43:
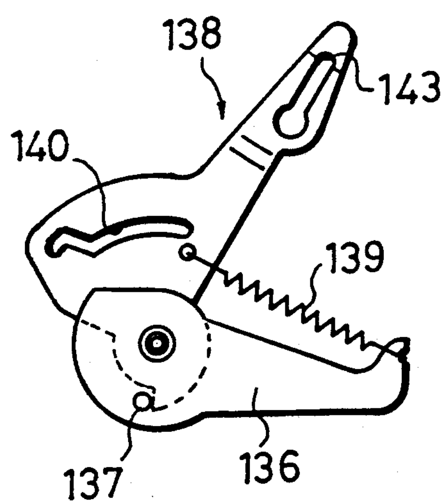
FIGS. 43 and 44 are a plan view and a side view indicating the state, where a first and a second eject arm are mounted.
Figure 44:
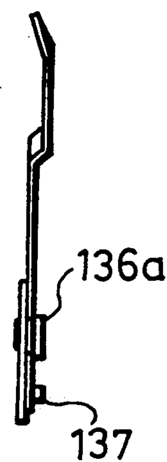

FIG. 1 is a perspective view of an audio reproduction device according to this invention; FIG. 2 is a perspective view of the same device seen in another direction; FIG. 3 is a bottom view of the same device; FIG. 4 is a plan view of the same device indicating the state, where the eject operation is terminated; FIG. 5 is a plan view of the same device indicating the state before the eject operation; FIG. 6 is a side view of the device indicated in FIG. 5; FIG. 7 is a side view of the device indicated in FIG. 4; FIGS. 8 to 10 are schemes for explaining the path portion, along which the movement of the driving motor is transmitted, FIG. 8 being a bottom view of the principal part of the device indicating a state, in which a second sub base is forwarded, power-assisted by the driving motor rotating counterclockwise; FIG. 9 being a bottom view of the principal part of the device indicating a state, in which a second sub base is forwarded, power-assisted by the driving motor rotating clockwise, FIG. 10 being a bottom view of the principal part of the device indicating a mechanism, in which movement is transmitted from the driving motor to a rack; FIGS. 11 and 12 are bottom views of the principal part of the device indicating the state where the select lever is in the right and the left position, respectively; FIGS. 13 to 16 are schemes for explaining the retreat movement of the head base in the eject operation, FIG. 13 being a plan view of the principal part of the device indicating the PLAY state in the FWD movement, FIG. 14 being a plan view of the principal part indicating a state in the course of the eject operation, FIG. 15 being a plan view of the principal part of the device indicating the state, where the eject operation is terminated, FIG. 16 being a plan view of the principal part of the device in the KEY OFF state, where the key is turned off, starting from the state indicated in FIG. 13; FIG. 17 is a plan view of the principal part of the device indicating the PLAY state in the FWD movement; FIG. 18 is a plan view of the principal part of the device indicating the state, where the head base is retreated; FIG. 19 is a plan view of the principal part of the device for explaining the FF operation; FIG. 20 is a plan view of the principal part of the device indicating the PLAY state in the RWD movement; FIG. 21 is a bottom view of the chassis; FIG. 22 is a front view of the pose lever; FIG. 23 is a front view of a rotating piece, on which a planet gear is mounted; FIG. 24 is a front view of a pinch lever; FIG. 25 is a front view of the select lever; FIG. 26 is a front view of a first sub base; FIG. 27 is a front view of the second sub base; FIG. 28 is a front view of the head base; FIGS. 29 and 30 are a plan view and a side view of a side plate, respectively; FIG. 31 is a front view of the clutch lever; FIGS. 32 and 33 are a side view and a plan view of the eject lever, respectively; FIG. 34 is a plan view of the plate base; FIGS. 35 and 36 are a plan view and a side view of the holder frame, respectively; FIGS. 37 to 40 are a plan view, a front view, and a left and a right side view of the cassette holder, respectively; FIGS. 41 and 42 are a bottom view and a side view of the bottom cover; and FIG. 43 and 44 are a plan view and a side view indicating the state, where a first and a second eject arm are mounted.

In these figures, reference numerals 1 is a chassis and a driving motor 2 is mounted on this chassis 1. The rotating journal 3 (FIG. 3) thereof protrudes from the rear side surface of the chassis 1 and a pulley 4 and a small gear 5 (FIG. 10) mounted on the rotating journal 3. Two capstan shafts 6 and 7 (FIG. 2) are mounted rotatably on this chassis 1 by means of bearings not shown in the figures. Flywheels 8 and 9 (FIG. 3) as well as gears 10 and 11 (FIG. 11) are mounted on these capstan shafts 6 and 7, respectively. A belt 12 is passed round the outer peripheries of these flywheels and the pulley 4 and a tension pulley 13 giving the belt 12 sufficient tension is mounted on the chassis 1. Pinch levers 14 and 15 are disposed rotatably on the capstan shafts 6 and 7, respectively. On one end of each of the pinch levers 14 and 15 is mounted each of gears 16 and 17 engaging with the gears 10 and 11 and on the other end thereof is formed each of bent cam holes 18 and 19, respectively. The gears 16 and 17 mounted on the pinch levers 14 and 15 are touched to and separated from reel gears 22 and 23 mounted rotatably on rotating shafts 20 and 21, respectively, which are in turn mounted on the chassis 1. On these rotating shafts 20 and 21 are disposed reel mechanisms 24 and 25, respectively (FIG. 2). On the other hand, pinch rollers 26 and 27 (FIG. 2) are touched to and separated from the capstan shafts 6 and 7. These pinch rollers 26 and 27 are mounted rotatably on pinch roller levers 28 and 29 through rotating shafts 30 and 31, respectively (FIG. 11). These pinch roller levers 28 and 29 and the rotating shaft 30 and 31 constitute a supporting member. These pinch roller levers 28 and 29 are mounted rotatably on shafts 32 and 33 disposed on the chassis 1, standing thereon, and the pinch rollers 26 and 27 are energized by springs 34 and 35 (FIG. 17) so as to be thrusted to the capstan shafts 6 and 7, respectively. One end of each of the rotating shafts 30 and 31 of these pinch rollers 26 and 27 is inserted in each of the cam holes 18 and 19 (FIG. 12) of the pinch levers 14 and 15 as well as touching and separating cam holes 37 and 38 (FIG. 11) disposed on the select lever 36. Guide holes 39 and 40 are formed at the two extremities of this select lever along the line connecting the two capstan shafts 6 and 7. The shafts 32 and 33 are inserted in these guide holes 39 and 40 so that the select lever 36 can slide according thereto. The cam holes 37 and 38 formed in the select lever 36 are tapered towards the inner edge thereof and two edge portions are formed at a thrusting cam portion 43 and a separating cam portion 44, respectively (FIG, 13). In the case where a rotating shaft 30 or 31 of a pinch roller 26 or 27 is located at this thrusting cam portion 43, a pinch roller 26 or 27 is thrusted to a capstan shaft 6 or 7 by a spring 34 or 35 (FIG. 17). Further, in the case where the rotating shaft 30 or 31 of the pinch roller 26 or 27 is located at the separating cam portion 44, the pinch roller 26 or 27 is separated from the capstan shaft 6 or 7 against the energizing force of the spring 34 or 35, and at the same time, since there is formed a recess portion for click in this separating cam portion 44, a click feeling is produced so that the select lever 36 can be positioned. Further, in the select lever 36 is formed a cam hole 46 for moving a cam 45 (FIG. 13), which corrects appropriately the position of magnetic head stated later at the change of the displacement direction of the tape, and at the neighborhood of this cam hole 46 is formed a hole 47 for inserting the select pin in the direction perpendicular to the guide holes 39 and 40 described above (FIG. 11). Further, a central piece 48 is disposed, extending from the center of the select lever 36 to the space between the reel mechanisms 24 and 25 and a rotation detecting gear 49 is mounted rotatably at the extremity of this central piece 48 (FIG. 11). A reflecting plate is disposed on one surface of this rotation detecting gear 49 and at the same time a helical slit is disposed in the radial direction. An optical sensor is disposed, opposite to this reflecting plate, on a base plate mounted on the chassis 1. Furthermore, the rotation detecting gear 49 is contacted with and separated from gears 50 and 51 (FIG. 14) rotating together with the tape winding shafts of the reel mechanisms 24 and 25. Reference numeral 52 indicates a detection window for the optical sensor formed in the select lever 36 (FIG. 25). A select pin 53 (FIG. 17)

inserted in an insertion hole 47 (FIG. 13) for the select pin formed in the select lever 36 is disposed on a rotating piece 54 (FIGS. 17 and 23) mounted rotatably on the chassis 1, protruding therefrom. As illustrated in FIG. 12, gear 55 and a small gear 56, which are formed in one body and whose rotation center is same as that of this rotating piece 54, are disposed rotatably. This gear 55 is engaged with the gear 11 described above through a reduction gear 57. On the other hand, the small gear 56 is engaged with an arc-shaped gear 59 through a planet gear 58 mounted at the free end of the rotating piece 54. Notches 60 and 61 (FIG. 11) are formed at the two extremities of this arc-shaped gear 59, which facilitate reengagement with planet gear 58. Further, the end of the rotation region of the rotating piece 54 corresponds to the end of the slide region of the select lever 36. In this case, the rotating shaft 30 or 31 of the pinch roller 26 or 27 is located at the touching and separating cam portion 44 of the select lever 36 (FIG. 17). The planet gear 58 and the arc-shaped gear 59 (FIG. 12) are completely disengaged by the fact that the select lever 36 is slightly slid outward by the click effect of this touching and separating cam portion 44. On the other hand, on the upper side surface of the select lever 36 is disposed a head base 63 (FIG. 13), on which a magnetic head 62 is mounted. This head base 63 is slid in the direction perpendicular to the slide direction of the select lever 36 by the fact that the guiding portion is guided by the shafts 32 and 33 described above. This head base 63 is formed in a rectangular frame shape and the reel mechanisms 24 and 25 are disposed within its window portion. Further a head position correcting cam 45 is supported by a rotating shaft 66 on the head base 63 and the magnetic head 62 is mounted on a magnetic head supporter supported by a rotating shaft 67 (FIG. 1). In addition, insertion holes 68 and 69 (FIG. 18), in which the rotating shafts 30 and 31 of the pinch roller 26 and 27 are inserted, are formed in the head base 63 and in this way they can be engaged with the rotating shafts 30 and 31 of the pinch roller 26 and 27 by the retreat movement of the head base 63. An FF locking hole **63*a* (FIG. 18) is formed at a corner in the front side of the head base 63. In this FF locking hole 63*a* are disposed a protrusion 63*b* and a stop portion 63*c*. A protruding piece 63*e* of a solenoid lever 63*d* inserted in the FF locking hole 63*a* is engaged with this protrusion 63*b*. In this way, the solenoid lever 63*d* is rotated; the protruding piece 63*e* of the solenoid lever 63*d* is contacted with the stop portion 63*c*; and the head base 63 is locked at a slightly retreated position. One end of this solenoid lever 63*d* is supported by a driving shaft 63*g* of a solenoid 63*f* and at the other end is formed an L-shaped bent piece 63*h*. This bent piece 63*h* is engaged with an engagement hole 63*i* formed in chassis 1. Further a sliding piece 63*j* sliding on the surface of the chassis 1 is formed on the solenoid lever 63*d* by bending it. In this way, the solenoid lever 63*d* is so constructed that it can rotate while being supported at 3 points. Further a roller 70 (FIG. 28), which can be engaged with a retreat cam stated later, is supported by a shaft 71 on the head base 63 and a first sub base 72 (FIG. 26) is engaged with this shaft 71. This shaft 71 is engaged with an elongated hole formed in the chassis 1 to be pivoted. Elongated holes 73 and 73 are formed in the same direction as the sliding direction of the head base 63 in the first sub base 72 and the upper portions of guide pins 75 and 75 (FIG. 27) disposed on the second sub base 74**, protruding upward and downward, are inserted in these elongated holes 73 and 73. The lower portions of these guide pins 75 and 75 are inserted in guide holes 76 and 76 formed in the chassis 1 (FIG. 21) and the second sub base 74 is slid in the same direction as the head base 63. A hook nail 77 (FIG. 27), is formed on this second sub base 74. One end of a helical spring 78 (FIG. 13) is hooked at this hook nail 77 and at the same time the other end of the helical spring 78 is hooked at a hook nail 79 disposed on the first sub base 72. On the other hand, a gear 81 supported rotatably by a supporting shaft 80 disposed on the chassis 1, (FIG. 8) protruding therefrom, is engaged with the small gear 5 of the driving motor 2 described above. A small gear 82 is disposed on the chassis 1 side of this gear 81 in one body. Further a pose lever 83 disposed rotatably on the supporting shaft 80 is inserted between this small gear 82 and the chassis 1 and the small gear 82 stated above is engaged with a pivoting gear 84 supported by a shaft on this pose lever 83. Further a notch 85 for restricting the rotation region is formed in the pose lever 83 and the two end edges 86 and 87 of this notch 85 are engaged with a stopper piece 89 formed on the chassis 1 by bending it (FIG. 8). This pivoting gear 84 of the pose lever 83 is engaged with a gear 91 supported by a supporting shaft 90 disposed on the chassis 1, protruding therefrom, at the position, where one of the end edges 86 is engaged with the stopper piece 89. Further, at the position, where the other end edge 87 of the pose lever 83 is engaged with the stopper piece 89, the pivoting gear 84 is not engaged directly with the gear 91 stated above, but it is engaged with the gear 91 through an intermediate gear 91*a*. This gear 91 is engaged with a pose gear 92. This pose gear 92 is supported rotatably by a supporting shaft 93 disposed on the chassis 1, protruding therefrom and a part of its outer periphery is cut off so as to form a lacking toothed wheel, in which a lacking tooth portion 94 is disposed. In addition, an engaging and stopping cam 95 is disposed (FIG. 8) at the central portion on one surface of the pose gear 92 and one of the guide pins 75 of the second sub base 74 stated above is engaged and stopped by this engaging and stopping cam 95 so that the second sub base 74 is locked at the engaging and stopping position. The engaging and stopping cam 95 is so set that the gear 91 is located at the lacking tooth portion 94 of the pose gear 92 at this engaging and stopping position and the rotating force of the pose gear 92, produced by the engaging and stopping, is stopped by the stopper mechanism. This stopper mechanism is so constructed that an arc-shaped protrusion 96 is disposed around a rotating shaft on one surface of the pose gear 92; a step portion 97 is disposed on the outer peripheral surface of this arc-shaped protrusion 96; and a stopper nail 99 of a play lever 98 composed of a rotating lever is engaged and stopped by this step portion 97. This play lever 98 is supported by a supporting shaft 100 disposed on the chassis 1, protruding therefrom and from a touching portion 101, which is touched to and separated from the outer peripheral surface of the arc-shaped protrusion 96 by the rotating movement of the play lever 98, is disposed on this play lever 98. Further a cut off groove portion 102 is disposed on the play lever 98 and positioning protrusions 103, 103 and 103 protrude at the two edge portions of this cut off groove portion 102. A rectangular tube-shaped working portion 104 (FIG. 8) is disposed between two of these protrusions 103. This working portion 104 is so constructed that it is closely held by excitation of a solenoid 105 mounted on the chassis 1 (FIG. 8). In addition, when the excitation of the solenoid is stopped, a guide pin 75 of a sub base 74 is engaged and stopped by the engaging and stopping cam 95 of the pose gear 92 and since the pose gear 92 is energized in the counterclockwise direction (FIG. 8), the pose gear 92 is separated from the step portion 94 to be rotated, while pushing a stopper nail 99 of the play lever 98 and the play lever 98 is rotated in the direction, where the working portion 104 is separated from the solenoid 105. Then, the touching portion 101 is touched to the outer peripheral surface on the edge side of the arc-shaped protrusion 96.

Furthermore a small gear 107 disposed rotatably on a clutch lever 106 is engaged with the small gear 82 contacted with the pose lever 83 stated above. This clutch lever 106 is supported rotatably by a supporting shaft 108 disposed on the chassis 1, protruding therefrom. A notch portion 109 is formed at one end of this clutch lever 106 and one end of a working piece 111 coupled with an eject solenoid 110 is inserted therein. This working piece 111 is supported by a fulcrum 112 formed by cutting off the chassis 1 at its central portion and the other end of the working piece 111 is engaged with a working shaft 112*a* of the eject solenoid 110. Further a small gear 113 engaged with a small gear 107 stated above is supported by a shaft on this clutch lever 106. A gear 114 engaged with this small gear 113 is supported by a supporting shaft 115 disposed on the clutch lever 106, protruding therefrom and this gear 114 is engaged with a rack driving gear 116. A tension spring 118 is disposed with a tensile force between this clutch lever 106 and a hook nail formed on the chassis 1 by bending it so that the clutch lever 106 is energized in the counterclockwise direction in FIG. 8 The clutch lever 106 is rotated in the clockwise direction through the working piece 111 by excitation of the eject solenoid 110 against the spring force of the tension spring 118. By these operations the small gear 107 of the clutch lever 106 is brought in the engaging or disengaging state with the small gear 82. Further a receiving piece portion 119 is formed on the clutch lever 106 by bending it at the end portion thereof, which is opposite to the notch portion 109 stated above. A locking piece portion 121 of the lock lever 120 supported by a shaft on the chassis 1 is engaged with this receiving piece portion 119. A detecting switch 122 is operated so as to be turned on and off by the rotating operation of this lock lever. On the other hand, the rack driving gear 116 stated above is supported by a supporting shaft 123 disposed on the bottom cover 167 indicated in FIGS. 41 and 42. A rack driving small gear 124 (FIG. 8), which is formed in one body with the rack driving gear 116, is supported by this supporting shaft 123 and this rack driving small gear 124 passes through the chassis 1 so as to be disposed on the front side surface This rack driving small gear 124 is engaged with a rack mounted on the eject lever 125 (FIGS. 32 and 33). As indicated in FIGS. 32 and 33, this eject lever 125 consists of a side plane portion 127 and a plane portion 128 formed by bending it, connected with the side plane portion at the upper edge thereof. Elongated holes 129 and 129 are formed in this side plane portion 127. Guiding protrusions 131 and 131 protruding from the side plane of the side plate 130 disposed on the chassis 1, standing thereon, are inserted in these elongated holes 129 and 129 so that the eject lever 125 is guided in the direction, along which a cassette is inserted and drawn out. Further an elongated hole 132 is formed in the plane portion 128 of the eject lever 125. A pin 134 (FIG. 29) protruding from a bent piece 133 (not shown) formed by bending the side plate 130 at the upper edge thereof is inserted in this elongated hole 132. Furthermore, a shaft receiving portion 136a (FIG. 44) of a first eject arm 136 bearing this pin 134 is inserted in the elongated hole 132 so that the eject lever 125 is guided without play. As indicated in FIGS. 43 and 44, a second eject arm 138 inserted in the shaft receiving portion 136a of this first eject arm 136 so as to be mounted rotatably in one assembly. Furthermore, an L-shaped slit 135 (FIG. 33) is formed in the plane portion 128 of the eject lever 125 and a protrusion 137 of the first eject arm 136 supported rotatably by the pin 134 stated above is inserted in this slit 135. In addition, the eject arm 138 is constructed so as to be rotated around the pin 134. A tension spring 139 (FIG. 43) is mounted with a tensile force between the second eject arm 138 and the first eject arm 136 so that the second eject arm 138 is contacted with the protrusion 137 of the first eject arm 136 and a constant spring force is maintained. A cassette insertion detecting cam 140 (FIG. 4) is formed in the second eject arm 138 and a protrusion 141a of a detecting lever 141 is inserted in this cam 140. This detecting lever 141 is supported by a shaft on the chassis 1 and a cassette insertion detecting switch 142 mounted on the chassis 1 is turned on and off by the rotating operation of this lever 141. That is, this cam is so constructed that an arc-shaped portion having a different radius from the pin 134 is formed continuously so that the detecting lever 141 is rotated, when the second eject arm 138 is slightly rotated in the counterclockwise direction from the state indicated in FIG. 4 (position indicated in chain-dotted line). Further an elongated hole 143, on which a cassette drawing-in slider stated later is mounted, is formed at the rotating end of the second eject arm 138. This elongated hole 143 is formed in the radial direction from the pin 134. A protruding piece 144 (FIG. 7) is disposed at the center of the lower edge of the side plane portion 127 of the eject lever 125 stated above, extending by passing through an elongated hole formed in the chassis 1. This protruding piece 144 is constructed so as to be engaged with the lock lever 120 stated above (FIG. 8). In addition, a ring piece 145 (FIG. 32) is formed at the lower edge of the side plane portion 127 of the eject lever 125 by bending it. An engaging and stopping piece 146a (FIG. 13) of a retreat cam 146, which retreats the head base 63, is engaged and stopped by this ring piece 145 and the retreat cam is slide-operated together with the eject lever 125 (FIG. 32). This retreat cam 146 is supported by pins 147 and 147 (FIG. 13) mounted on the chassis 1 so as to slide freely. The head base 63 is retreat-operated by the fact that a roller 70 is contacted with the retreat cam 146. Further a cassette holder up and downward moving cam 148 is formed in the side plane portion 127 of the eject lever 125 of FIG. 32 and a pin 150 secured to the base plate 149 is inserted in this cam 148. As indicated in FIG. 34, this base plate 149 consists of a plane plate portion 151 and bent plates 152 and 153 formed at adjacent sides of the plane plate portion 151 by bending it. The pin 150 stated above is disposed on this bent plate 152, protruding therefrom and at the same time rotating shafts 154 and 154 are disposed on the bent plates 152 and 153 so as to extend therefrom. These rotating shafts 154 and 154 are supported by a side plate 130 (FIGS. 29 and 30) and a holder frame 155 (FIGS. 35 and 36) mounted on the chassis 1. Further a slit for slide 156 is formed in the plane plate portion 151 of the plate base 149 (FIG. 34) along the cassette insertion direction. A cassette drawing-in slider 157 is inserted slidably in this slit 156 (FIG. 1). A protrusion 158 of this slider 157 is inserted slidably in the elongated hole 143 formed in the second eject arm 138 (FIG. 1). In addition, a protruding piece 159 (FIG. 34) and a lifting piece 160 are disposed at the rotating end of the plane plate portion 151 of the plate base 149, extending therefrom, and this protruding piece 159 is engaged with a cassette holder 161. As indicated in FIGS. 37 to 40, this cassette holder 161 consists of a ceiling plate 162 and extended plates 163 and 163 formed at two side edges of the ceiling plate by bending it and guiding pieces 164—are formed at the cassette insertion aperture by bending it outward. Further an engaging hole 165, with which the protruding piece 159 stated above is engaged, is formed in the ceiling plate 162 of the cassette holder 161 and the lifting piece 160 of the plate base 149 is disposed on the lower surface of this ceiling plate 162. In addition, a window portion 166 for cleaning the magnetic head 62 is formed in the ceiling plate 162 so that the magnetic head 62, which is in the play position, can be cleaned from the front of the audio reproduction device owing to this window portion 166 in the state, where no cassette is loaded. In this way, this cassette holder 161 is moved between the upper and the lower positions by the rotating operation of the plate base 149, guided by the holder frame 155.

Now the operation of the embodiment constructed as described above will be explained.

Cassette insertion operation

When a cassette is inserted in the cassette holder 161 from the state indicated in FIG. 4, where an eject operation is terminated, the cassette is contacted with the cassette drawing-in slider 157 to push slider 157 and at the same time the slider 157 hooks at the reel hole in the cassette. When the slider 157 is slid backward, the second eject lever 138 is rotated in the counterclockwise direction against the spring force of the tension spring 139. Then the protrusion 141a of the detection lever 141 is moved along the cassette insertion detecting cam 140 of the second eject lever 138 at the position of the second eject lever 138 (indicated in FIG. 4 in chain-dotted line) and the detection lever 141 is also rotated so that the cassette insertion detecting switch 142 is turned on. The driving motor 2 is driven by this turning-on of the switch 142 and the rack 126 is moved towards the left in FIG. 4 through the small gear 5, the gear 81, the small gear 82, the small gears 107 and 113, the gear 114, the rack driving gear 116 and the rack driving small gear 124 indicated in FIG. 10. The eject lever 125 is moved downward together and the protrusion 137 of the first eject arm 136 is contacted with the end portion of the slit 135 so that the first eject arm 136 is rotated in the counterclockwise direction around the pin 134. Further the cassette drawing-in slides 157 is slid backward along the slit for slide 156 and the cassette is drawn-in by the fact that the second eject arm 138 is rotated in the same direction by the protrusion 137, as indicated in FIG. 5. In addition, the pin 150 of the plate base 149 is moved from the upper position to the lower position along the cassette holder up and downward moving cam 148 of the side plane portion 127 from the state indicated in FIG. 7 by the movement of the eject lever 125 and the plate base 149 is rotated downward around the rotating shaft 154 so that the cassette holder 161 falls to the lower position, as indicated in FIG. 6. In this state the protruding piece 144 on the side plane portion 127 of the eject lever 125 is disengaged from the rock lever 120 and the clutch lever 106 is rotated in the counterclockwise direction by the tension spring 118. In this way, the small gear 107 is disengaged from the small gear 82 and the cassette insertion operation is terminated.

Reproduction operation

Figure 15:
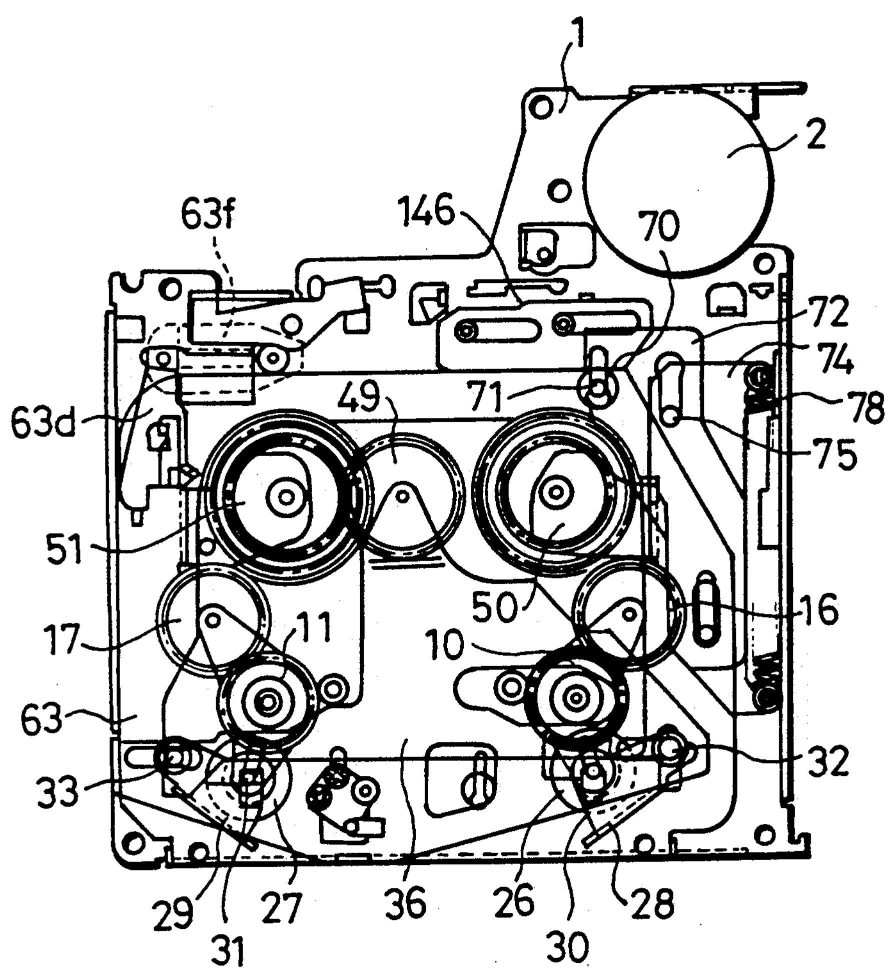
Figure 16:
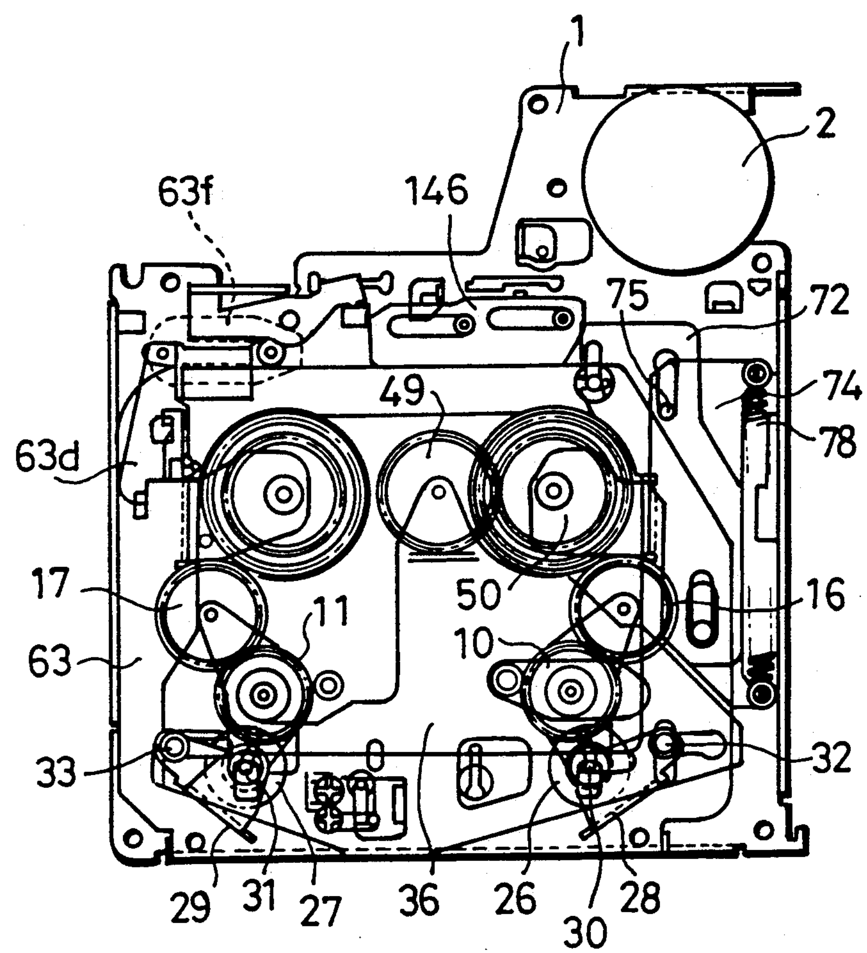

Before the cassette insertion operation described above, the head base 63 is retreated by the retreat cam 146, as indicated in FIG. 15. The retreat cam 146 is moved towards the left, as the eject lever 125 moves in the cassette insertion operation described above. Then the roller 70 supported by the head base 63 is thrusted by the retreat cam 146 to be contacted therewith, but the head base 63 becomes movable forward. On the other hand, the second sub base 74 is on the retreat side at the termination of the eject operation indicated in FIG. 15. When the driving motor 2 is CCW-rotated as indicated in FIG. 8, the movement thereof is transmitted to the gear 81 through the small gear 5 and the small gear 82 is rotated clockwise. Then the pose lever 83 slidably contacted with the small gear 82 is also rotated clockwise and stopped, when it is touched to the stopper piece 89. At this position the pivoting gear 84 is directly engaged with the gear 91 and the gear 92 is rotated clockwise. At this time, since the gear 91 and the pose gear 92 are engaged with each other, the pose gear 92 is rotated counterclockwise and the engaging and stopping cam 95 is contacted with the guide pin 75 of the second sub base 74 and lifts it upward against the helical spring 78. Then, as indicated in FIG. 8, the guide pin 75 is engaged with the engaging and stopping cam 95 and stopped so that the second sub base 74 is in the engaged and stopped state. At this time, the rotation of the pose gear 92 is prevented by the fact that the stopper nail 99 of the play lever 98 is engaged with the step portion 97. Further, in this state, the gear 91 is positioned at the lacking tooth portion 94 of the pose gear 92 and thus the driving force is not transmitted. In this way, the power-assist operation is effected; the second sub base 74 is engaged and stopped in its advanced position; the spring force of the helical spring 78 acts as the forwarding force for the first sub base 72 and the head base 63; and thus the head base 63 is surely forwarded.

On the other hand, in the case where the driving motor 2 is rotated clockwise, as indicated in FIG. 9, the small gear 82 is rotated counterclockwise and the pose lever 83 is rotated in the same direction. Then, since the pivoting gear 84 is engaged with the gear through the intermediate gear 91*a*, the rotational direction of the gear 91 is clockwise just as in the preceding case so that the power-assist operation is effected. In this way, what ever is the rotational direction of the driving motor 2; forward or backward, the head base 63 is forwarded.

Auto-reverse operation

At the auto-reverse operation, i.e. when the forwarding direction of the tape is reversed, an operation, by which the head base 63 is once retreated and then forward, a so-called pose operation is necessarily performed. In this way, the capstan shafts 6 and 7 are surely separated from the pinch rollers 26 and 27 at the moment, where the forwarding direction is reversed.

At first, at the FWD forwarding, i.e. in the case where the driving motor 2 is rotated clockwise, as indicated in FIG. 11, the flywheels 8 and 9 are rotated clockwise by the belt 12 passed round the pulley 4. The gear 55 and the small gear 56 are rotated clockwise through the reduction gear 57 engaged with the gear 11. Then, since the planet gear 58 engaged with this small gear 56 is rotated counterclockwise and the planet gear 58 is engaged with the arc-shaped gear 59, the rotating piece 54 is rotated clockwise and thus the state indicated in FIG. 11 is established. The select pin 53 is moved by the rotational movement of this rotating piece 54 and thus the select lever 36 is displaced. By this displacement of the select lever 36 one of the pinch rollers 27 is located at the thrusting cam portion 43 of the touching and separating cam hole 38 and the pinch roller 27 is thrusted to the capstan shaft 7 by the spring 35. The other pinch roller 26 is located at the separating cam portion 44 and separated away from the capstan shaft 6 against the force of the spring 34. At this time, since the separating cam portion 44 has a click effect, the select lever 36 is slightly towards the left and the rotating piece 54 engaged by the select pin 53 is rotated clockwise. That is, the planet gear 58 is completely disengaged from the arc-shaped gear 59 and the select lever 36 is positioned at the left end.

Furthermore, the rotating shafts 30 and 31 of the pinch roller 26 and 27 are inserted in the cam holes 18 and 19 formed in the pinch levers 14 and 15, respectively, and the pinch lever 15 is rotated clockwise by the rotating shaft 31 of the pinch roller 27, which is thrusted to the capstan shaft 7 so that the gear 17 is engaged with the reel gear 23. On the other hand, the pinch lever 14 is rotated clockwise by the rotating shaft 30 of the pinch roller, which is separated from the capstan shaft so that the gear 16 is disengaged from the reel gear 22. In this way, the clockwise rotation of the driving motor is transmitted to the reel gear 23 through the belt 12, the flywheel 9, the gear 11 and the gear 17 so that the reel gear 23 is rotated clockwise and the reel mechanism 25 is operated so that the tape of the loaded cassette is wound.

On the other hand, at the RWD movement, i.e. in the case where the driving motor 2 is rotated counterclockwise, as indicated in FIG. 12, the flywheels 8 and 9 are rotated counterclockwise by the pulley 4 through the belt 12. Then the rotation of the gear 11 makes the planet gear 58 rotate clockwise through the reduction gear 57, the gear 55 and the small gear 56. In this way, the rotating piece 54 is rotated counterclockwise and the select lever 36 engaged with the select pin 53 is moved towards the right contrarily to the FWD movement, the pinch roller 27 is separated from the capstan shaft 7 by this movement of the select lever 36 and the pinch roller 26 is thrusted to the capstan shaft 6 to be contacted therewith. Further, as described above, the planet gear 58 is completely disengaged from the arc-shaped gear 59 by the clock effect of the separating cam portion 44 and the select lever 36 is positioned at the right end.

Further, in this state, the pinch levers 14 and 15 are rotated counterclockwise and the gear 17 of the pinch lever 15 is disengaged from the reel gear 23. On the other hand, the gear 16 of the pinch lever 14 is engaged with the reel gear 22. In this way, the reel mechanism 24 is operated so that the cassette tape is wound.

On the other hand, the rotation detecting gear 49 disposed on the central piece 48 of the select lever 36 is engaged with the gear 50 of the reel mechanism 24, i.e. the gear on the winding side, at the FWD movement. Then, when the tape is stopped at the end of the tape, the rotation of the gears 52 and 51 coupled with the reel mechanisms 24 and 25, respectively, is stopped and the rotation of the rotation detecting gear 49 is stopped. This stoppage of the gear 49 is detected by the optical sensor and the excitation of the solenoid 105 is stopped by this detection signal. Thus the pose operation stated later is effected. Then the driving motor 2 is driven in the direction opposite to the rotational direction before the stoppage and the reproduction operation described previously is effected. In this way, the autoreverse operation is carried out.

FF/FEW and QUE/REVEW operation

In the case where the FWD movement state indicated in FIG. 17 is switched over to the FF state, when the excitation of the solenoid 105 is stopped, since the second sub base 74 is energized in the retreat direction by the tension spring 139, the pose gear 92 is rotated counterclockwise by the guide pin 75 of the second sub base 74 through the engaging and stopping cam 95 of the pose gear 92 and the stopper nail 99 is separated from the step portion 97. In this way, the guide pin 75 of the second sub base 74 is retreated to the position indicated in FIG. 10 by the tension spring 139. Further the pose gear 92 is brought into the state, where it is engaged with the gear 91 by the rotation of the gear 91, and a power-assist operation is effected, where the driving motor 2 is again rotated. At this time, the head base 63 is retreated by the springs 34 and 35 stated above to the position indicated in FIG. 18.

In this pose state the protruding piece 63*e* of the solenoid lever 63*d* inserted in the FF locking hole 63*a* formed in the head base 63 is engaged with the protrusion 63*b* and the solenoid lever 63*d* is brought into the state, where it is closely held on the solenoid 63*f*. When the solenoid 63*f* is excited, the solenoid lever 63*d* is maintained in the state, where it is closely held. When the head base 63 is operated to be advanced by the power-assist operation stated above, the head base 63 is stopped by the fact that the protruding piece 63*e* of the solenoid lever 63*d* is engaged with the step portion 63*c* thereof, as indicated in FIG. 19. Further, in the pose state indicated in FIG. 18, the pinch rollers 26 and 27 are separated from the capstan shaft 6 and 7, respectively, by the retreating movement of the head base 63 and at the same time the pinch lever 14 and 15 are rotated in the direction, where the gears 16 and 17 thereof go away from the reel gears 22 and 23, by the retreating movement of the rotating shafts 30 and 31 of the pinch rollers 26 and 27, on the basis of the positional relationship of the cam holes 18 and 19 of the pinch lever 14 and 15, so that no driving force is transmitted to the reel mechanisms 24 and 25. On the other hand, in the FF state indicated in FIG. 19, the pinch rollers 26 and 27 are separated from the capstan shafts 6 and 7, respectively. However, the gear 17 of one of the pinch levers 15 is engaged with the reel gear 23 and the cassette tape is wounded by the reel mechanism 25. At this time, the governer of the driving motor 2 is disconnected by a micro-computer (not shown in the figure) and the rotational speed of the driving motor 2 is increased, which creates an FF state in a state, where the constant angular speed rotation of the reel mechanism 25, which is the tape winding side, is removed. Further, the REW operation is effected also on the side of the reel mechanism 24 in the same way as the FF operation described above. In addition, the QUE/REVEW operation is effected with the governer of the driving motor in the FF/REW operation stated above, where the constant angular speed rotation is carried out.

Pose operation

When the mode changes from the PLAY state in the FWD movement to the following, in the case where the driving motor 2 is brought into the state, where it rotates in the direction opposite to that at the FWD movement, a pose operation, by which the pinch roller 26 or 27 is separated from the capstan shaft 6 or 7, is effected. That is, in the case where the RWD movement indicated in FIG. 20 is effected from the PLAY state in the FWD movement indicated in FIG. 17, the excitation of the solenoid 105 indicated in FIG. 10; the play lever 98 is rotated; and the stopper nail 99 is separated from the step portion 97. In this way, the pose gear 92 becomes rotatable; the guide pin 75 of the second sub base 74 pushes the engaging and stopping cam 95 of the pose gear 92 towards the left so that the engaging and stopping cam 95 is disconnected; and the second sub base 74 is moved in the retreat direction by the tension spring 139. Then the head base 63 is moved backward by the springs 34 and 35 and the rotating shafts 30 and 31 of the pinch roller 26 and 27 engaged with the head base 63 are retreat-operated. In this way, the pose state is established, in which the pinch rollers 26 and 27 are separated from the capstan shafts 6 and 7, respectively. After that, the driving motor 2 is rotated in the reverse direction and the succeeding mode, e.g. REW operation, is performed. In this way, by removing the contact of the pinch rollers 26 and 27 with the capstan shafts 6 and 7, respectively, it is possible to prevent the winding of the tape on the capstan shaft 6 or 7 due to the difference in the winding direction.

Eject operation

Figure 13:
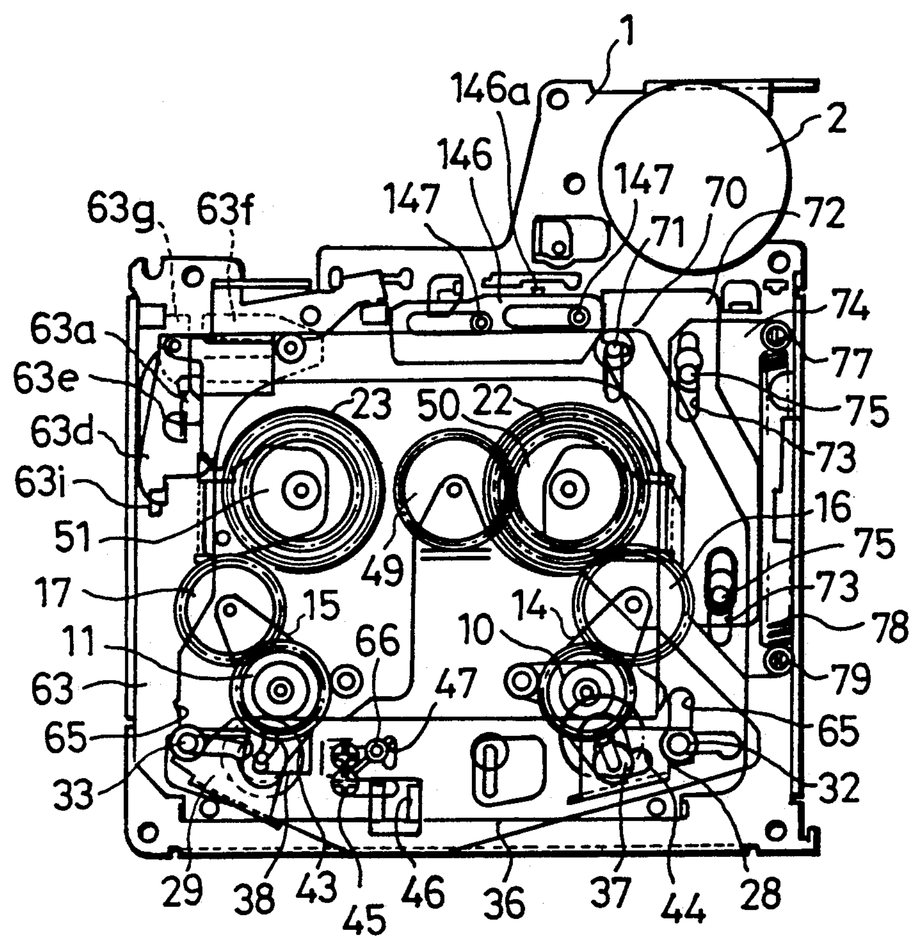
FIGS. 13 to 16 are schemes for explaining the retreat movement of the head base in the eject operation, FIG. 13 being a plan view of the principal part of the device indicating the PLAY state in the FWD movement, FIG. 14 being a plan view of the principal part indicating a state in the course of the eject operation, FIG. 15 being a plan view of the principal part of the device indicating the state, where the eject operations is terminated, FIG. 16 being a plan view of the principal part of the device in the KEY OFF state, where the key is turned off, starting from the state indicated in FIG. 13.
Figure 14:
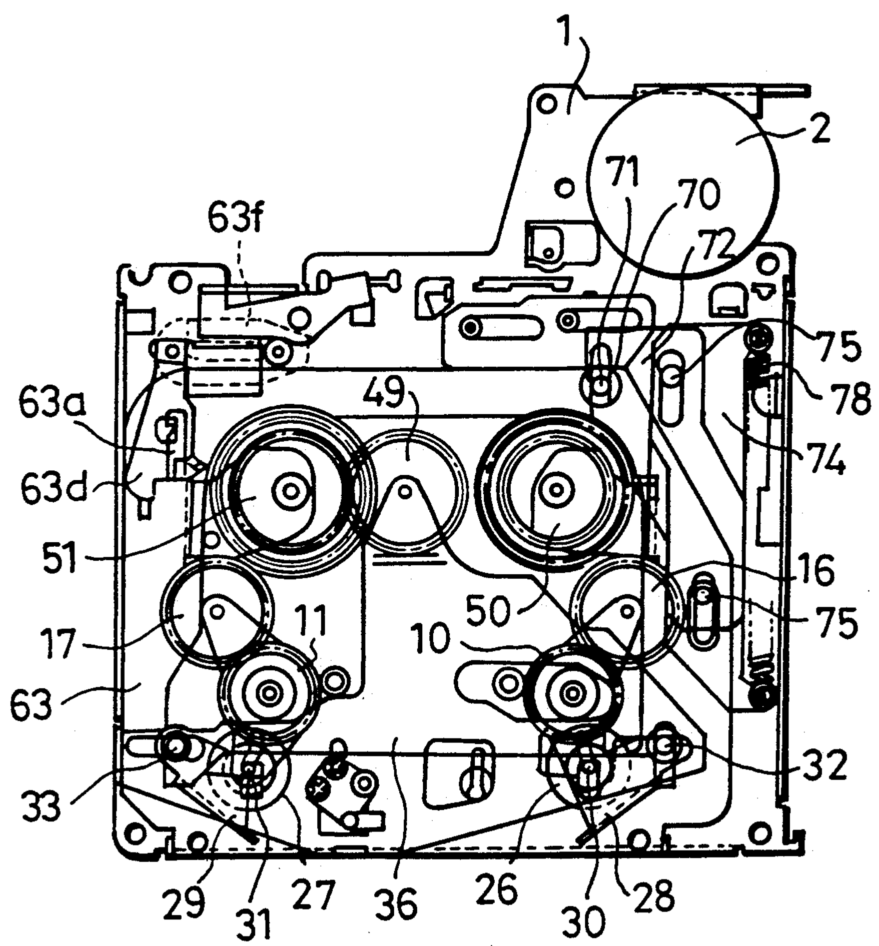

The eject operation starts from the PLAY state in the FWD movement indicated in FIG. 13. As indicated in FIG. 10, when the eject solenoid 110 is excited, the clutch lever 106 is rotated clockwise around the supporting shaft 108 through the working piece 111 so that the small gear 107 is engaged with the small gear 82. Then, when the driving motor 2 is driven counterclockwise, the rack driving gear 116 and the rack driving small gear 124 are rotated clockwise through the small gear 5, the gear 81, the small gear 82, the small gears 107 and 113 and the gear 114. The driving small gear 124 is engaged with the rack 126, as indicated in FIG. 5, and the rack is moved towards the right. The eject lever 125, on which this rack is mounted, the pin 150 of the plate base 149 is moved from the lower position to the upper position along the cassette holder up and downward moving cam 148 of the eject lever 125 and the plate base 149 is rotated upward around the rotating shaft 154 so that the cassette holder 161 is raised to the upper position. Further the protrusion 137 of the first eject arm 136 is moved upward by the end portion of the slit 135. Then the first eject arm 136 is rotated clockwise around the pin 134 and the state indicated in FIG. 4 is realized. At this time, the lock lever 120 is locked by the protruding piece 144, as indicated in FIG. 10, and the engagement of the small gear 107 of the clutch lever 106 with the small gear 82 is maintained. Furthermore, the second eject arm 138 stretched by the first eject arm 136 and the tension spring 139 is drawn by the spring force of the tension spring 139 and the second eject arm 138 is rotated clockwise. Then the cassette drawing-in slider 157 engaged with the second eject arm 138 is, slid forward along the slit for slide 156 so that the cassette is ejected.

Furthermore, the retreat cam 146 is moved by the movement described above of the eject lever 125 and the retreat cam 146 is contacted with the roller 70 of the head base 63 forwarded as indicated in FIG. 13 as that the head base 63 is retreated, as indicated in FIG. 15. In this state, the head base 63 is locked by the retreat cam 146 not to advance. This retreat movement of the head base 63 is made possible by extension and contraction of the helical spring 78 passed between the first sub base 72 and the second sub base 74 with tension.

When the power supply is switched off from the state indicated in FIG. 13, since the excitation of the solenoid 105 in the power assist mechanism described above is also stopped, the lock of the guide pin 75 of the second sub base 74 by the engaging and stopping cam 95 of the pose gear 92 is removed and the second sub base 74 is moved backward.

In the embodiment thus constructed, the drive motor 2 is rotated forward or backward and the pair of reel mechanisms 24 and 25 as well as the pair of capstan journals 6 and 7 are rotated by the rotation of the drive motor 2. The pair of pinch rollers 26 and 27, which are touched to and separated from these capstan journals 6 and 7 are disposed, respectively. The insertion holes 68 and 69 formed in the head base 63 are engaged with the rotating shafts 30 and 31 of the pinch rollers 26 and 27 and the pinch rollers 26 and 27 are separated forcedly from the capstan journals 6 and 7. The holding mechanism for advancing this head base 63 holds it at its advanced position and the engagement of the guide pin 75 of the second sub base 74 linked with the head base 63 with the engaging and stopping cam 95 of the pose gear 92 is released by stopping the excitation of the solenoid in this holding mechanism. Thus the advanced head base 63 is brought to its retreated pose position. Consequently, since it is possibly to release the holding mechanism, when the drive motor 2 passes from the PLAY state to the rotation state, where the rotational direction is reversed with respect to that in the PLAY state, even if the pinch rollers 26 and 27 and the capstan journals 6 and 7 rotate in the directions, which are opposite to each other, the tape is never moved in the reverse direction and it is prevented that the tape is wound around the capstan journals 6 and 7.

Further, the head base 63 is advanced by the holding mechanism having the pose gear 92 and the advancing movement of the head base 63 is prevented by the fact that the protruding piece *63e* of the solenoid lever *63d* constituting the FF/REW mechanism is engaged with the step portion *63c* of the FF locking hole *63a* in the head base 63. In this state, the pinch rollers 26 and 27 are separated from the capstan journals 6 and 7 by the head base 63 and the FF/REW operation is effected.

Furthermore, even if the drive motor 2 is rotated forward or backward, the rotation thereof is transmitted to the pivoting gear 84 of the pose lever 83 through the small gear 81, etc. Then, the pose lever 83 is rotated, depending on the rotational direction of the drive motor 2 so that the pivoting gear 84 is engaged with the pose gear 92 directly or indirectly through the intermediate gear *91a*. In this way, the pose gear 92 is rotated in a fixed direction, independently of the rotational direction of the drive motor 2 and the second sub base 74 is advanced by the engaging and stopping cam 95. Then the head base is also advanced through the helical spring 98 and the power-assist operation is effected.

In addition, since the rotational direction of the drive motor 2 at the FWD movement is so set that it is the same as the rotational direction of the drive motor 2 at the tape loading, the PLAY state begins always with the FWD movement after the tape loading, independently of the direction of the tape movement at the eject operation.

In this way, the drive motor 2 of type capable of rotating both forward and backward can be used. In this way, various sorts of operation mechanisms are simplified and fabrication cost can be reduced.

As explained above, according to this invention, since the holding mechanism is released and the contact between the pinch rollers and the capstan journals removed, when the drive motor is rotated in the reverse direction, even if the capstan journals are rotated in the reverse direction, the tape is never moved in the reverse direction. Therefore, the tape is never wound around the capstan journals and an excellent tape movement can be obtained.

Further, according to this invention, a drive motor capable of rotating both forward and backward can be used. In this way, various sorts of operation mechanisms are simplified and fabrication cost can be reduced.

What is claimed is:

1. A tape recording apparatus comprising:

a motor rotatable both in a forward direction and a reverse direction;

a pair of capstan journals coupled to said motor such that said journals rotate in the same direction as said motor;

a pair of pinch rollers mounted on a pair of leaves, said pair of pinch rollers and said pair of leaves being movable in one direction to bring said pinch rollers into contact with said capstan journals and tape interposed between said capstan journals and said pinch rollers, and movable in another direction to separate said pinch rollers from said capstan journals;

a head base for mounting a magnetic head in operative relationship to said tape, said head base being held in a retreated position by a spring wherein said magnetic head is separated from said tape, and said head base being slidably movable into an advanced position wherein said magnetic head contacts said tape;

a head base advancing mechanism for moving said head base against a force of said spring and into said advanced position, said head base advancing mechanism comprising a sub base coupled to said head base for movement with said head base and a gear having a cam surface engaged with said sub base, said gear being rotatable by said motor such that said cam moves said sub base toward said advanced position;

a change mechanism coupled to said gear and being operative to rotate said gear in one direction regardless of said rotation direction of said motor;

a holding mechanism engaged with said gear for holding said head base in said advanced position, wherein when said motor begins an operation to change direction of rotation when said magnetic head is reproducing, said holding mechanism is released from said gear and said head base moves into said retreated position, and said gear is rotated in the same direction regardless of the direction of rotation of said motor, whereafter said sub base is moved to said advanced position by said cam and said head base is held at said advanced position by said holding mechanism engaged with said gear.

2. The tape recording apparatus according to claim 1, wherein said gear includes a step portion and wherein said holding mechanism comprises a rotatable lever and a solenoid, said rotatable lever having a stopper portion engagable with said step portion of said gear to fix said gear against rotation, said solenoid being capable of holding, when supplied with an electrical current, said rotating lever such that said stopper portion of said rotating lever is held in engagement with said step portion.

3. The tape recording apparatus according to claim 1, wherein said head base includes a locking hole and said head base further includes a locking stop portion extending into said locking hole and said tape recording apparatus further comprises:

a lever rotatably secured to said chassis and positioned for engagement with said locking stop portion of said head base; and a solenoid positioned in operative relationship with said lever such that when said solenoid is energized during FF/REW (Fast Feed/Rewind) operations said solenoid restricts rotation of said lever to prevent said head base from moving to said advanced position.

4. The tape recording apparatus according to claim 1, wherein said tape recording apparatus includes a governor coupled to said motor for maintaining the speed of said motor at a constant value and wherein during FF/REW (Fast Feed/Rewind) operations said governor is disengaged from said motor.

* * * * *

UNITED STATES PATENT AND TRADEMARK OFFICE

CERTIFICATE OF CORRECTION

PATENT NO. : 5,006,941
DATED : April 9, 1991
INVENTOR(S) : Akira Otsuki

It is certified that error appears in the above-identified patent and that said Letters Patent is hereby corrected as shown below:

Column 16, lines 32 and 33, Claim 1, "leaves" should read --levers--.

Signed and Sealed this

Twenty-ninth Day of September, 1992

Attest:

DOUGLAS B. COMER

*Attesting Officer* — *Acting Commissioner of Patents and Trademarks*